(12) United States Patent
Saito

(10) Patent No.: US 8,094,386 B2
(45) Date of Patent: *Jan. 10, 2012

(54) IMAGING LENS

(75) Inventor: Tomohiro Saito, Kawaguchi (JP)

(73) Assignee: Enplas Corporation, Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/584,194

(22) Filed: Aug. 31, 2009

(65) Prior Publication Data

US 2010/0053777 A1  Mar. 4, 2010

(30) Foreign Application Priority Data

Sep. 4, 2008  (JP) .................. 2008-226920

(51) Int. Cl.
  *G02B 9/10* (2006.01)
  *G02B 13/18* (2006.01)
(52) U.S. Cl. .................. 359/795; 359/717
(58) Field of Classification Search .......... 359/717, 359/795, 785, 692, 793
  See application file for complete search history.

(56) References Cited

U.S. PATENT DOCUMENTS

| 7,164,545 | B2 | 1/2007 | Saito |
| 7,167,324 | B2 | 1/2007 | Saito |
| 7,525,741 | B1 * | 4/2009 | Noda ............... 359/795 |
| 2007/0229987 | A1 * | 10/2007 | Shinohara ........... 359/784 |
| 2008/0100926 | A1 * | 5/2008 | Chen et al. ......... 359/717 |
| 2008/0137219 | A1 * | 6/2008 | Noda ............... 359/795 |

FOREIGN PATENT DOCUMENTS

| JP | 2004-170460 | 6/2004 |
| JP | 2004-170883 | 6/2004 |
| JP | 2004-177628 | 6/2004 |
| JP | 2004-246169 | 9/2004 |
| JP | 2004-252067 | 9/2004 |
| JP | 2006-119331 | 5/2006 |
| JP | 2006-154517 | 6/2006 |
| JP | 2006-178026 | 7/2006 |
| JP | 2008-152004 | 7/2008 |

* cited by examiner

*Primary Examiner* — Ricky Mack
*Assistant Examiner* — Zachary Wilkes
(74) *Attorney, Agent, or Firm* — DLA Piper LLP (US)

(57) ABSTRACT

An imaging lens consisting of in order from an object side to an image surface side, a diaphragm, a first lens that is a meniscus lens having a positive power whose convex surface faces the object side and a second lens that is a lens having a negative power whose concave surface faces the object side, wherein a condition expressed by the following expression is satisfied: $0.05 \leq r_1/r_2 \leq 0.29$, where $r_1$ is a center radius curvature of the object side surface of the first lens and $r_2$ is the center radius curvature of the image surface side of the first lens.

7 Claims, 39 Drawing Sheets

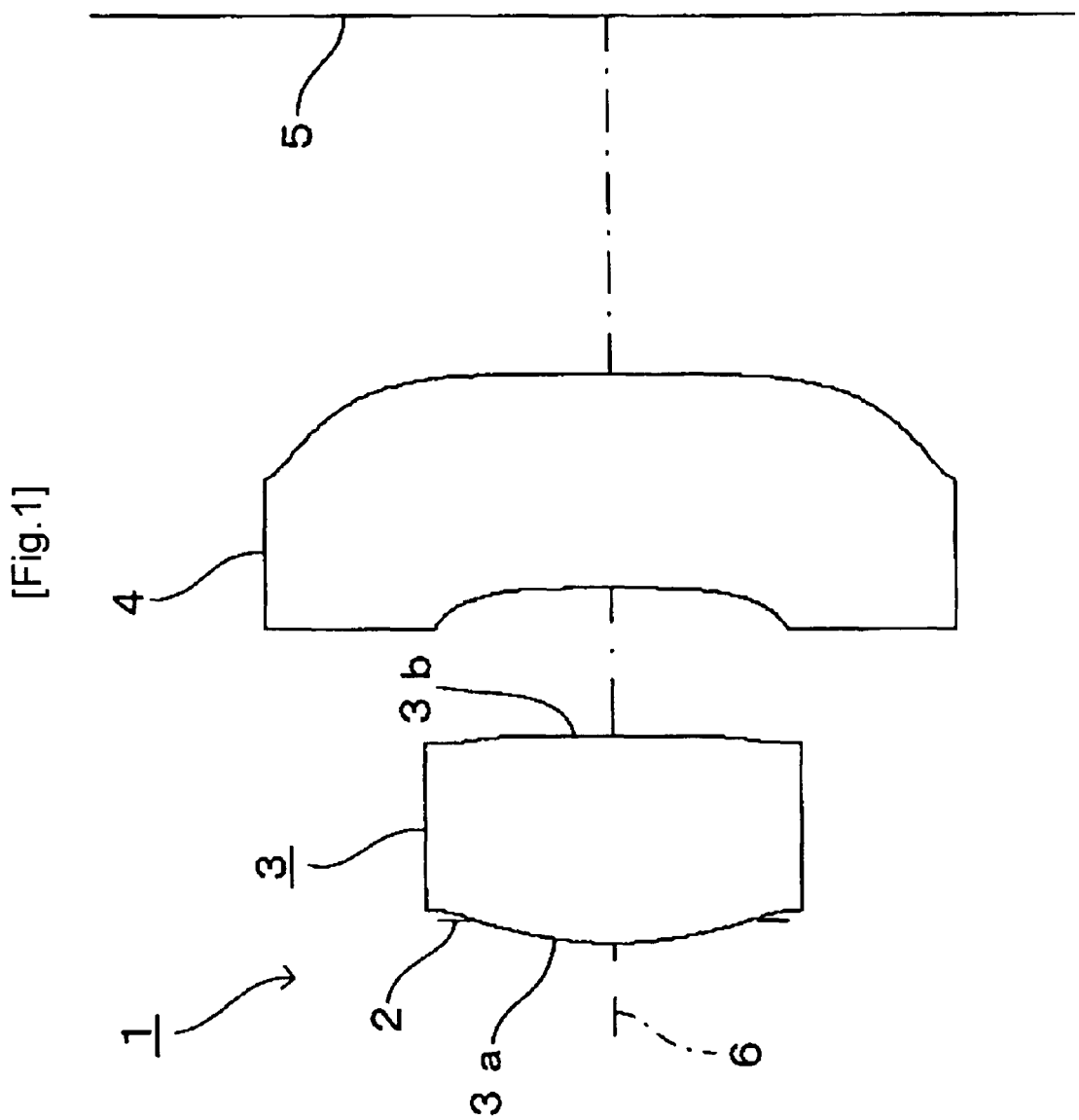

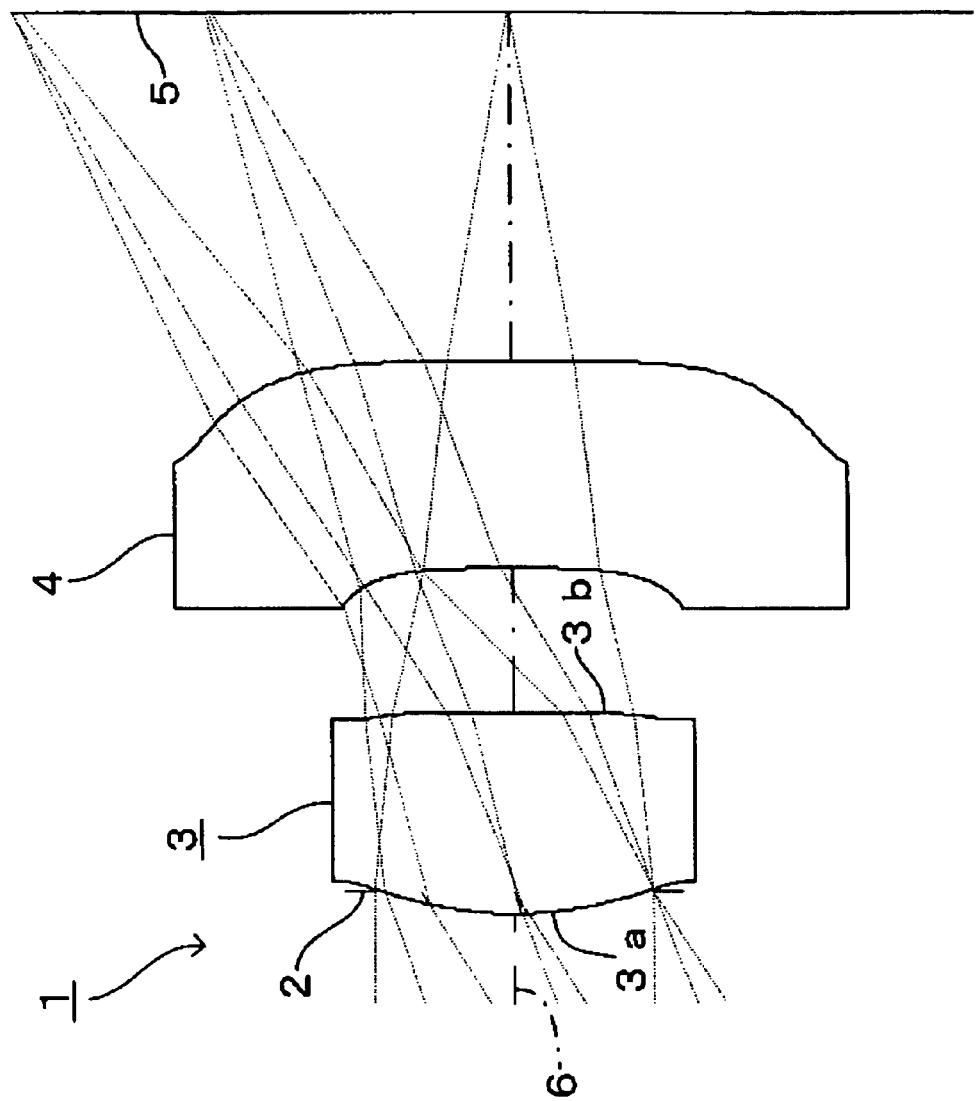

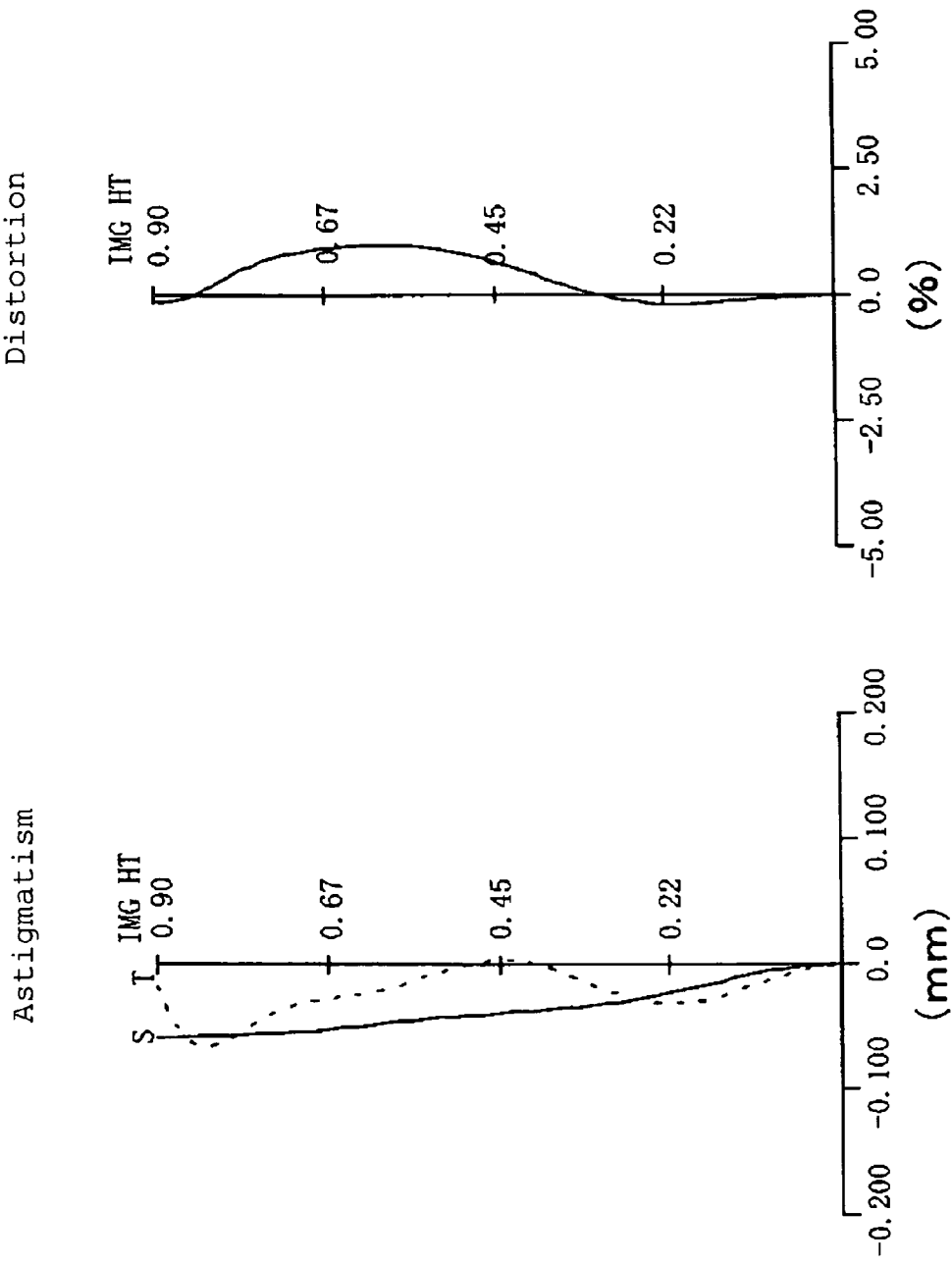
[Fig.3]

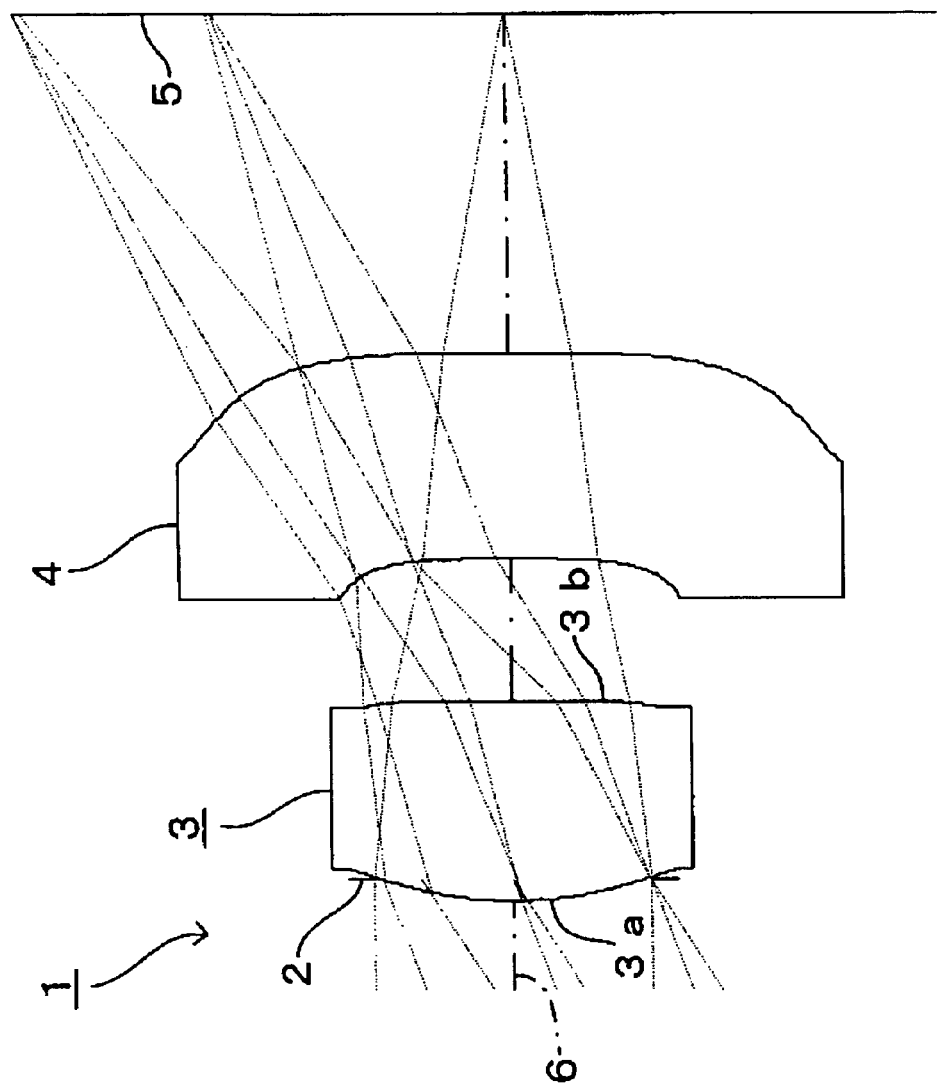

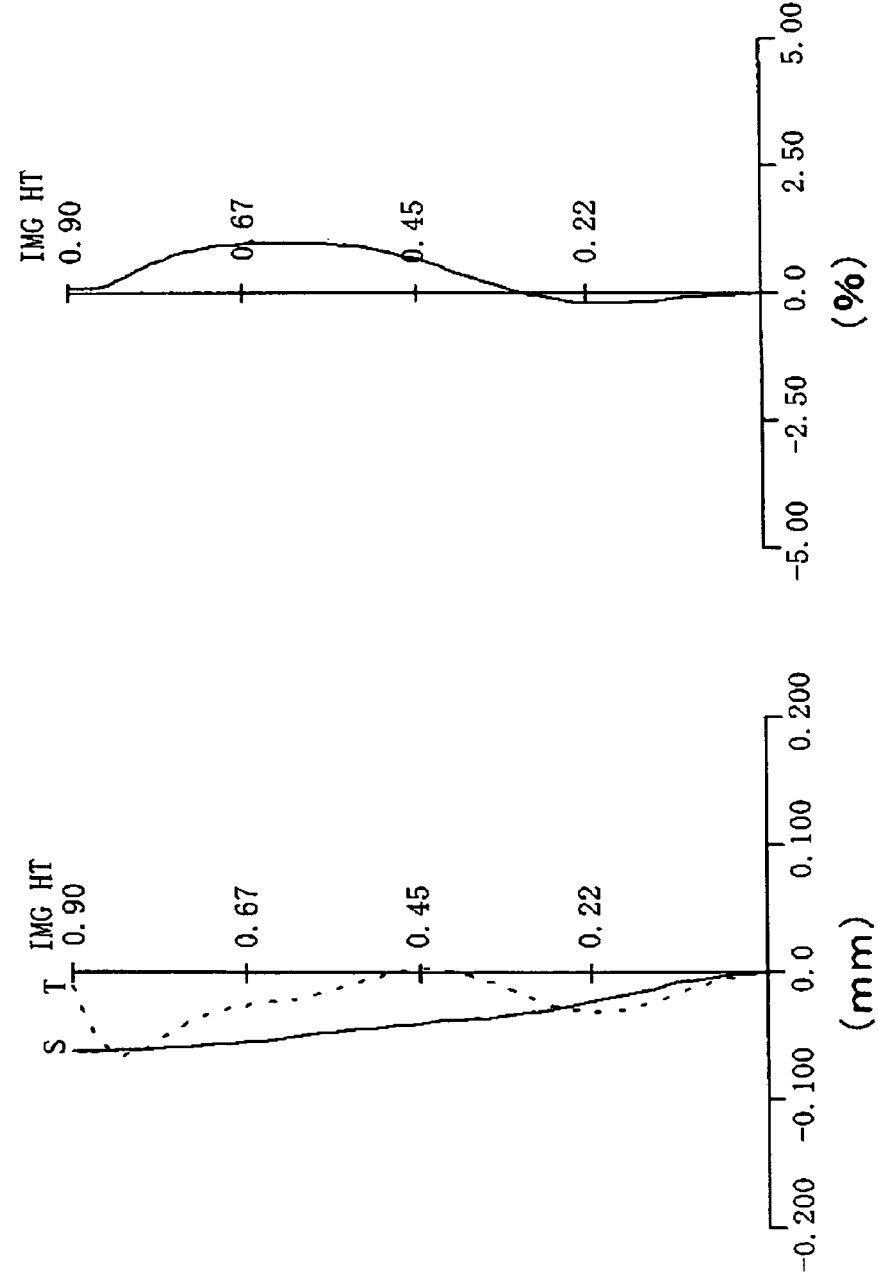
[Fig.5]

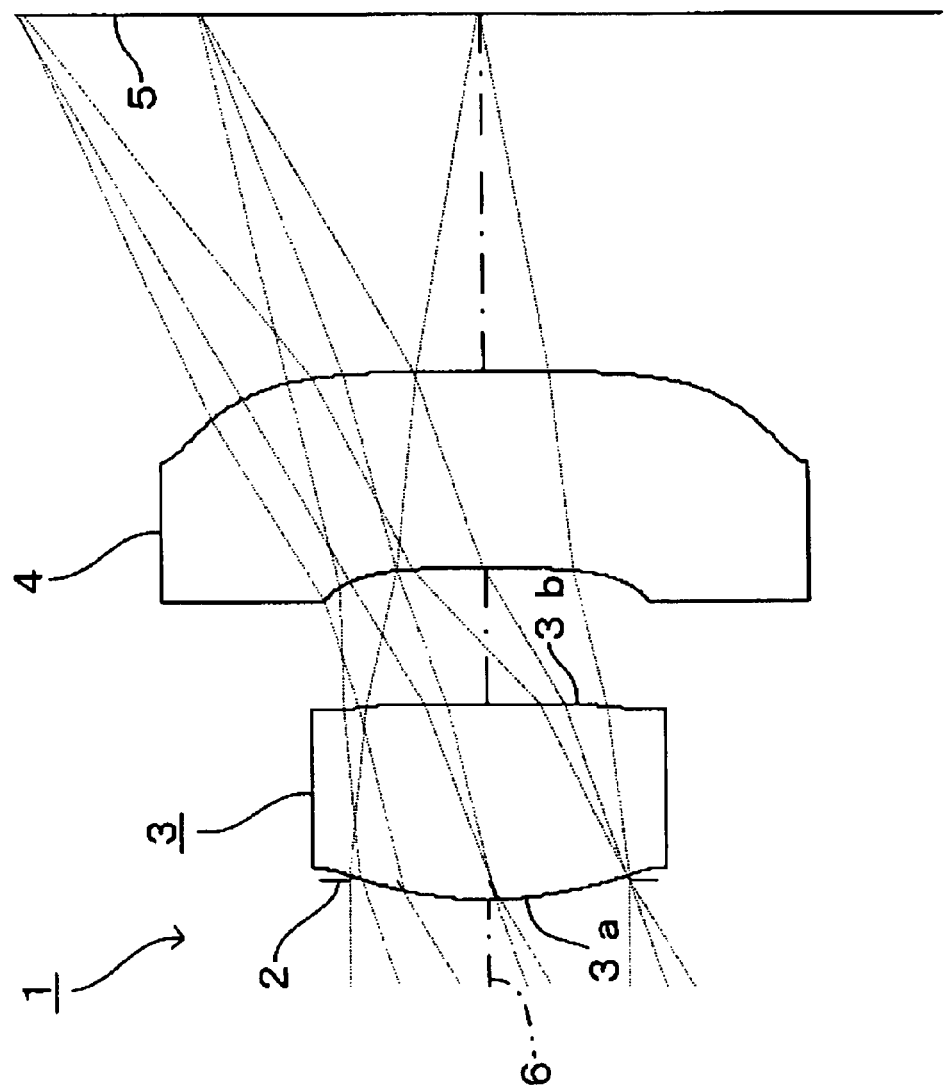

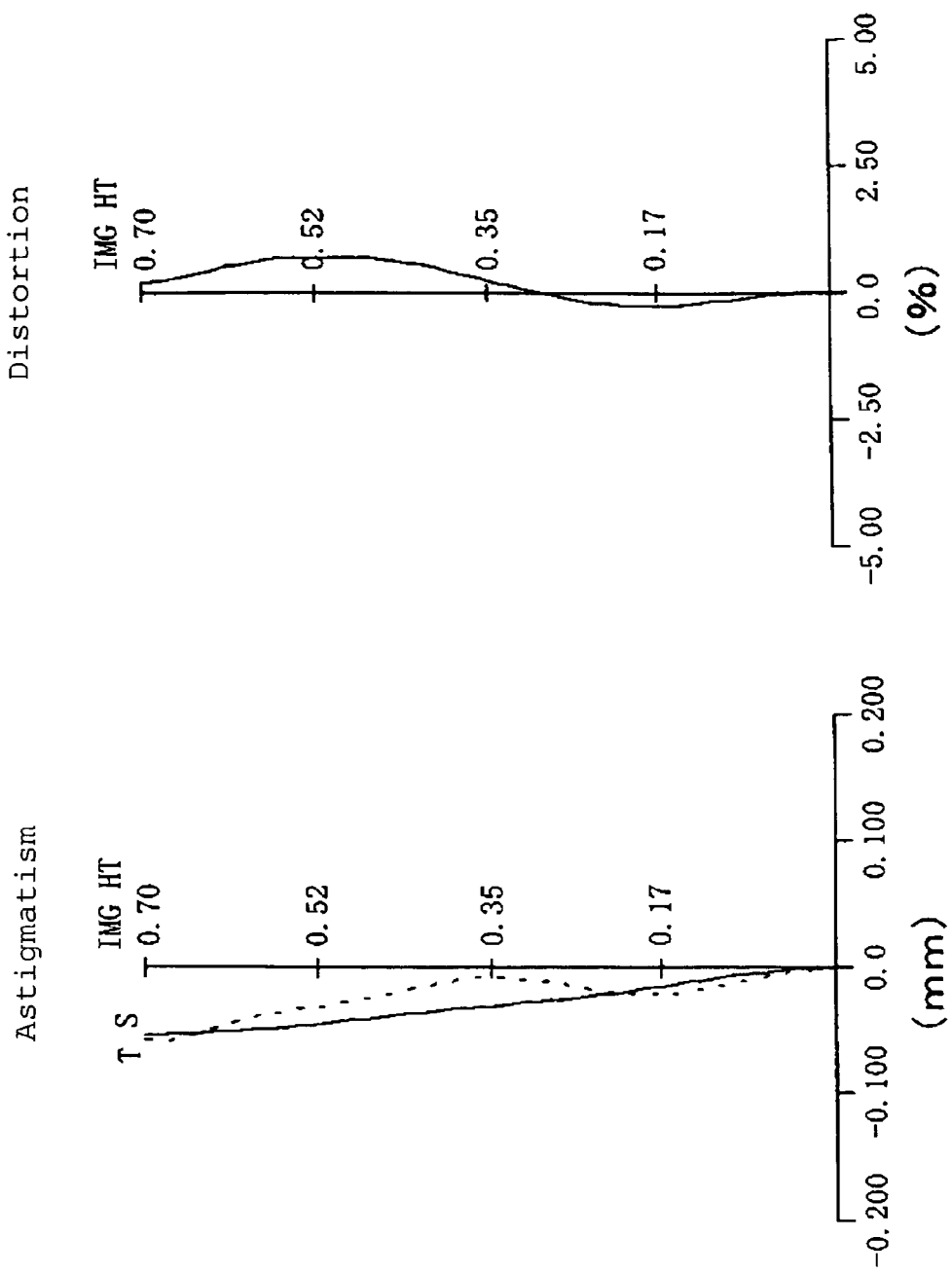

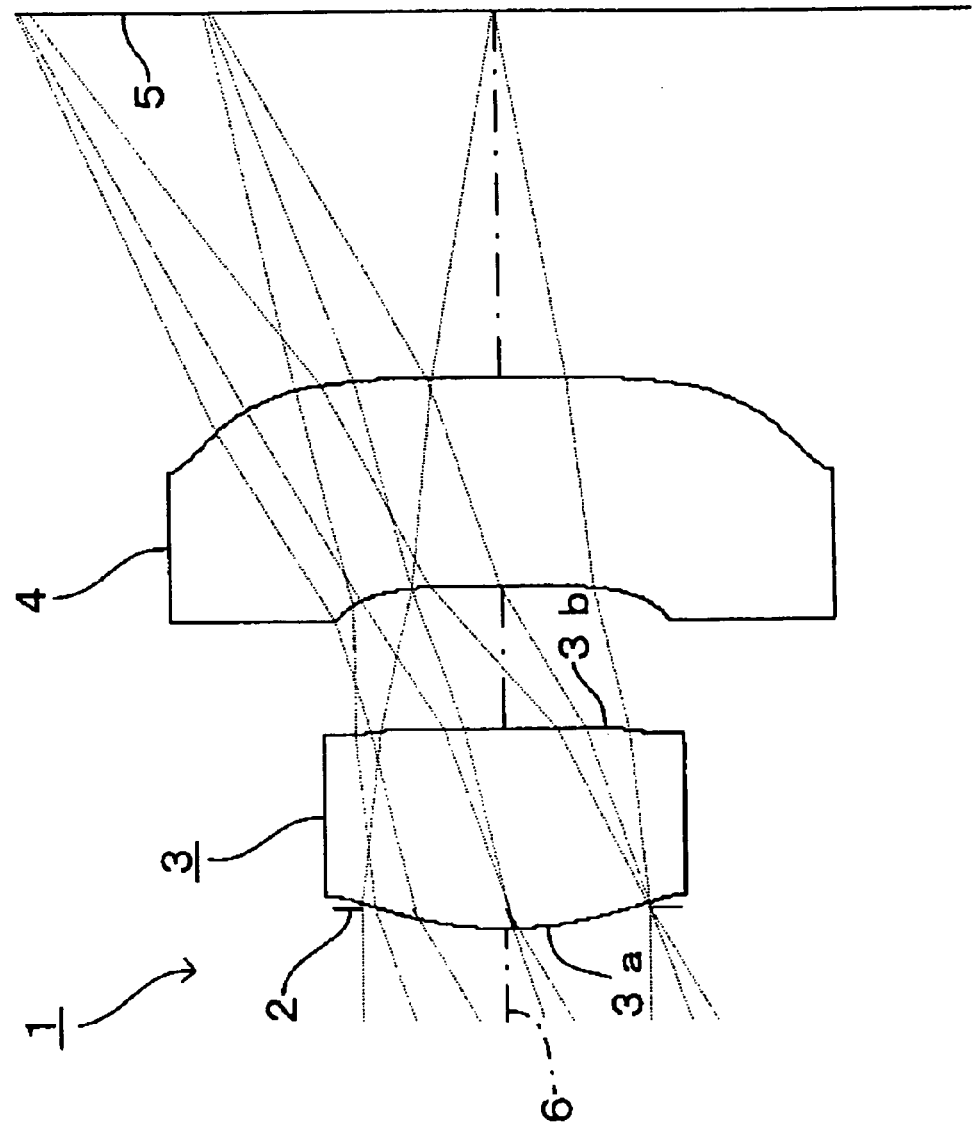
[Fig.8]

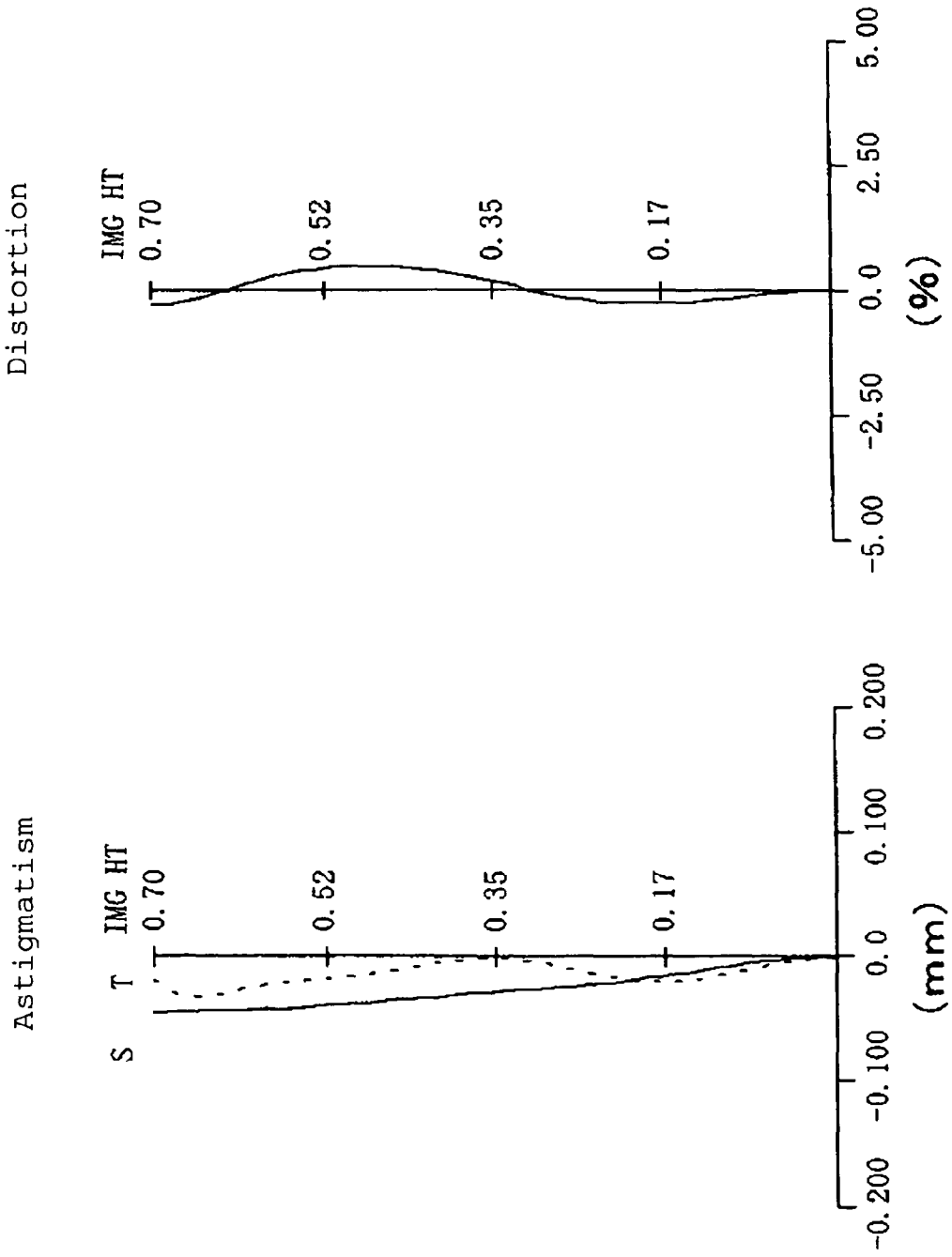

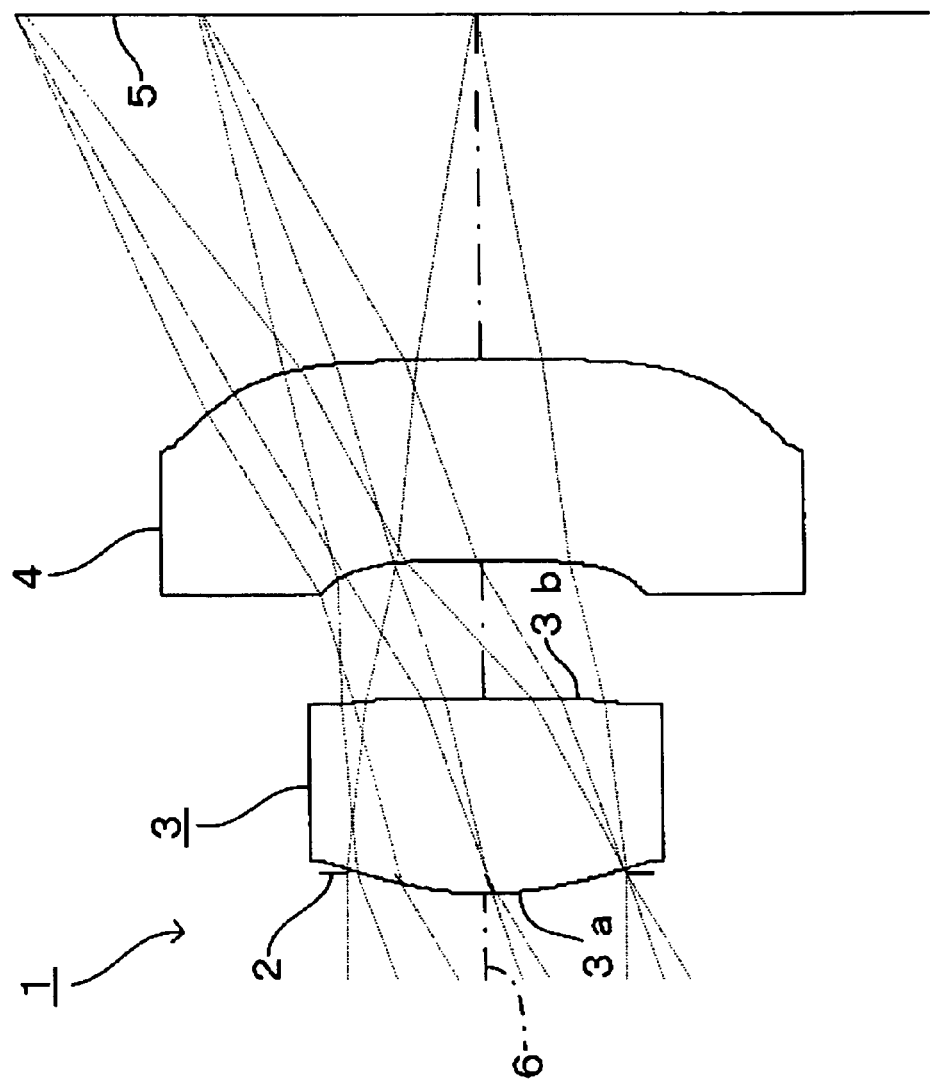
[Fig.10]

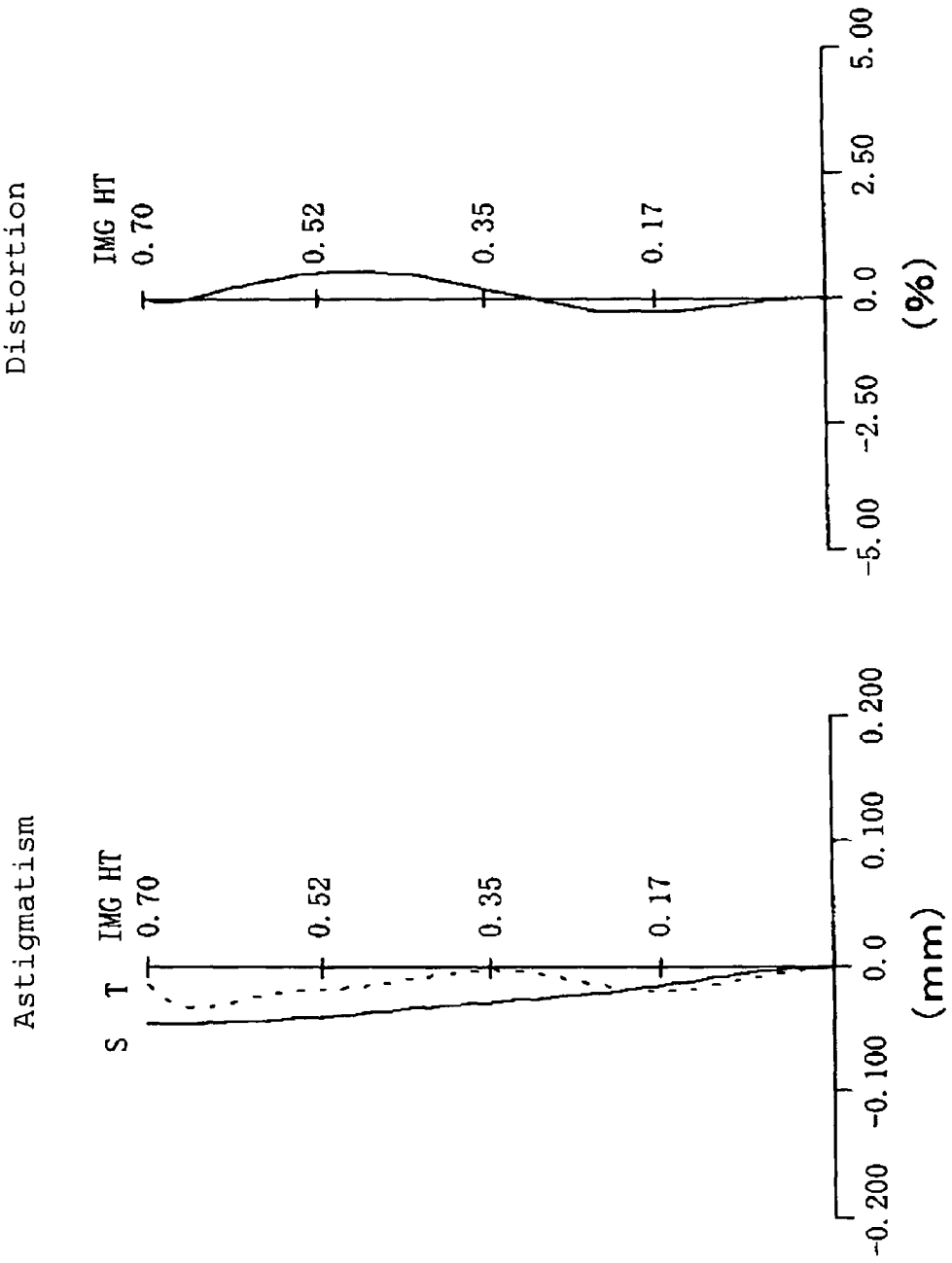

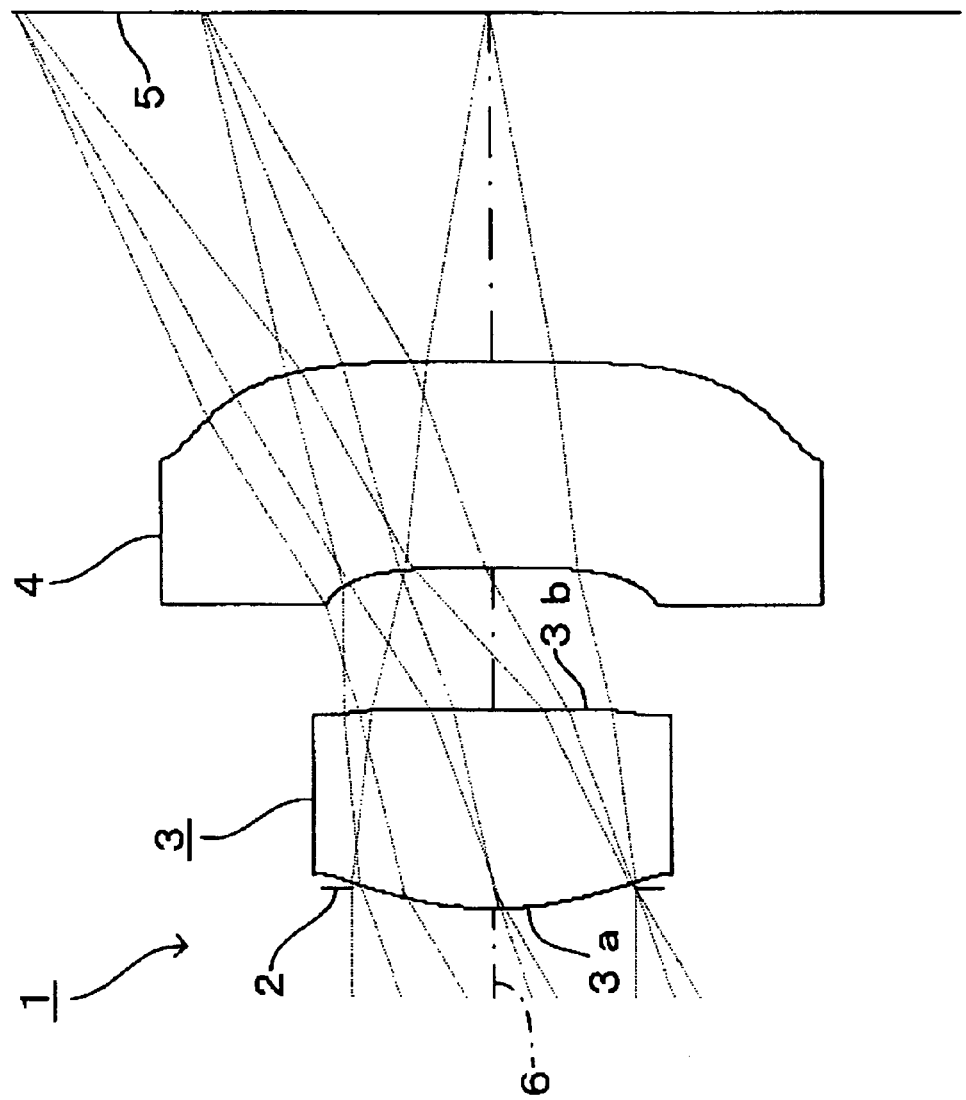
[Fig.12]

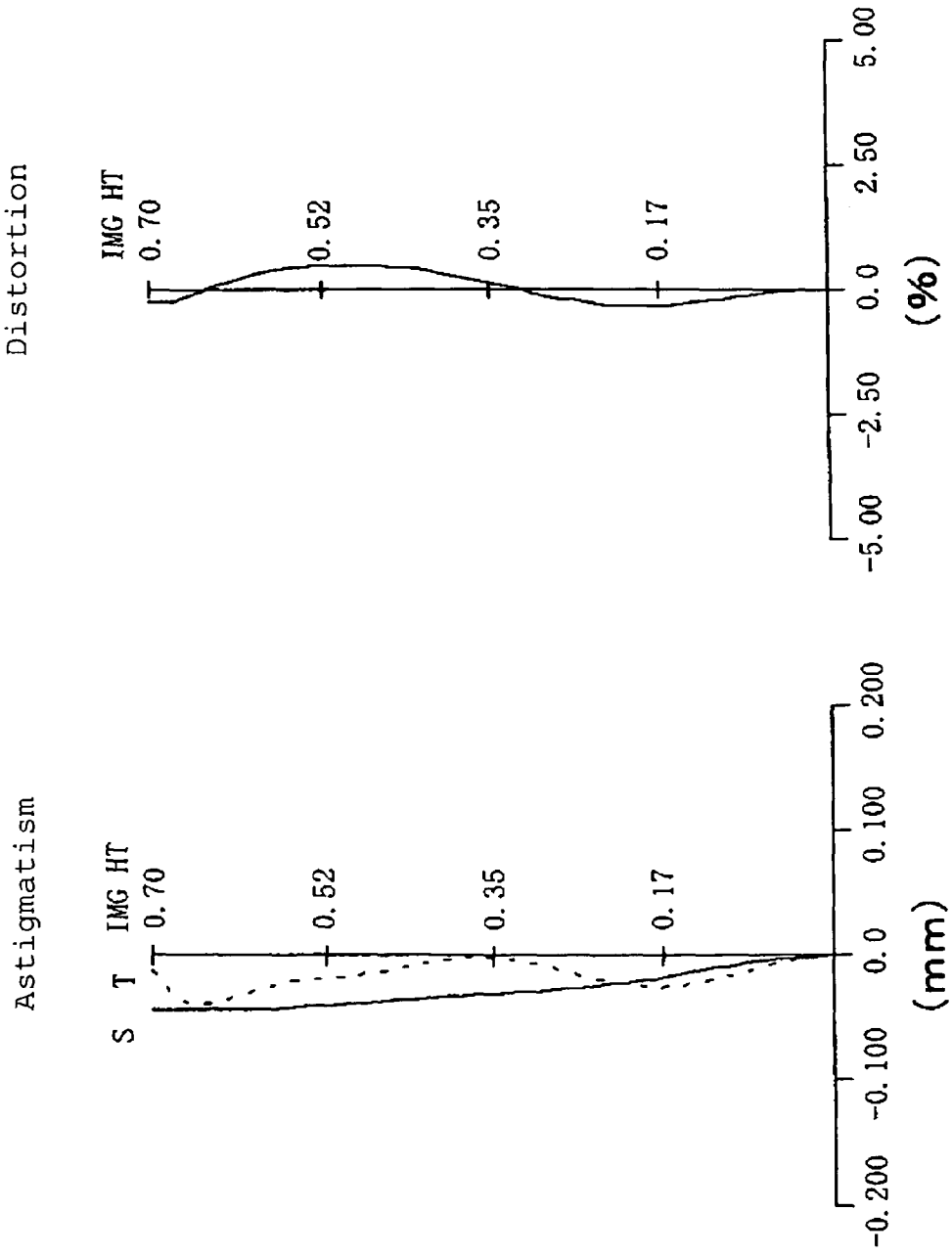

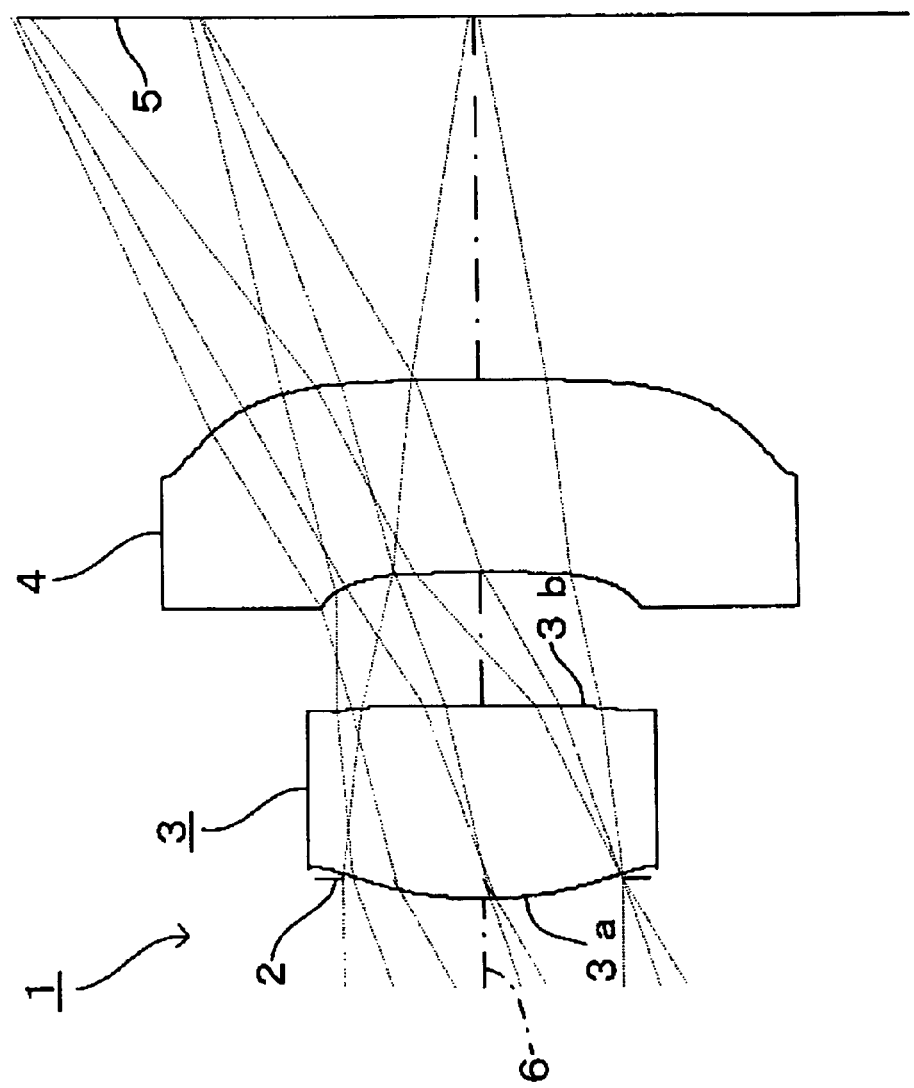

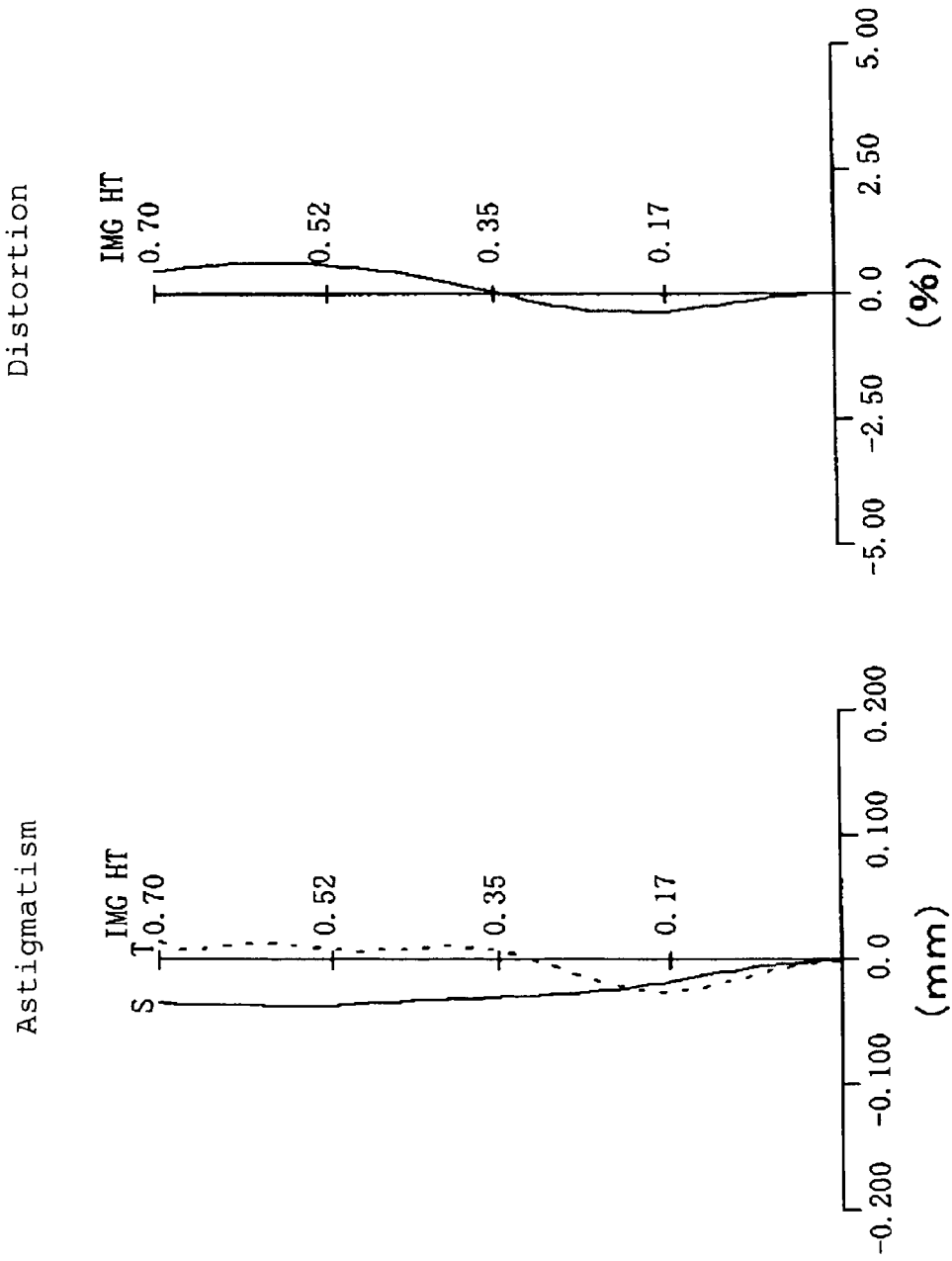

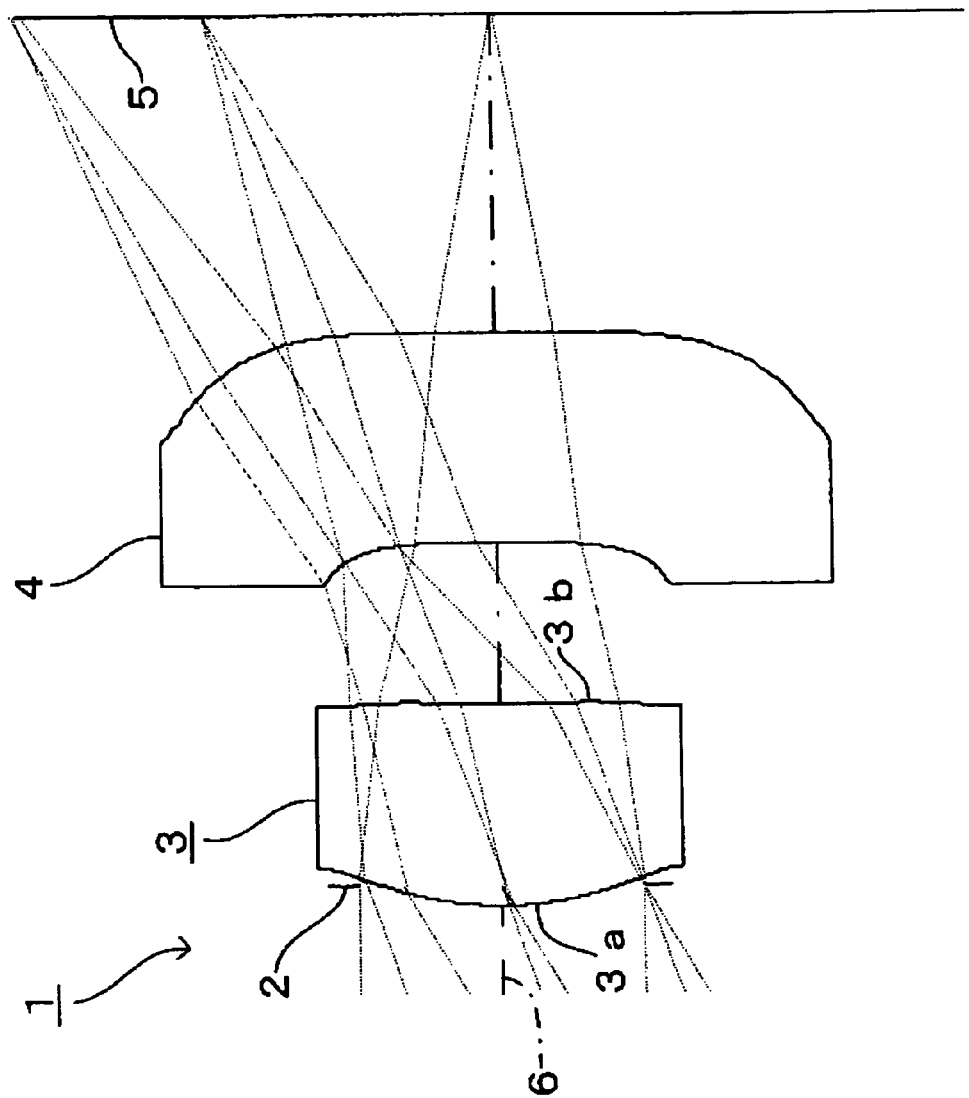
[Fig.16]

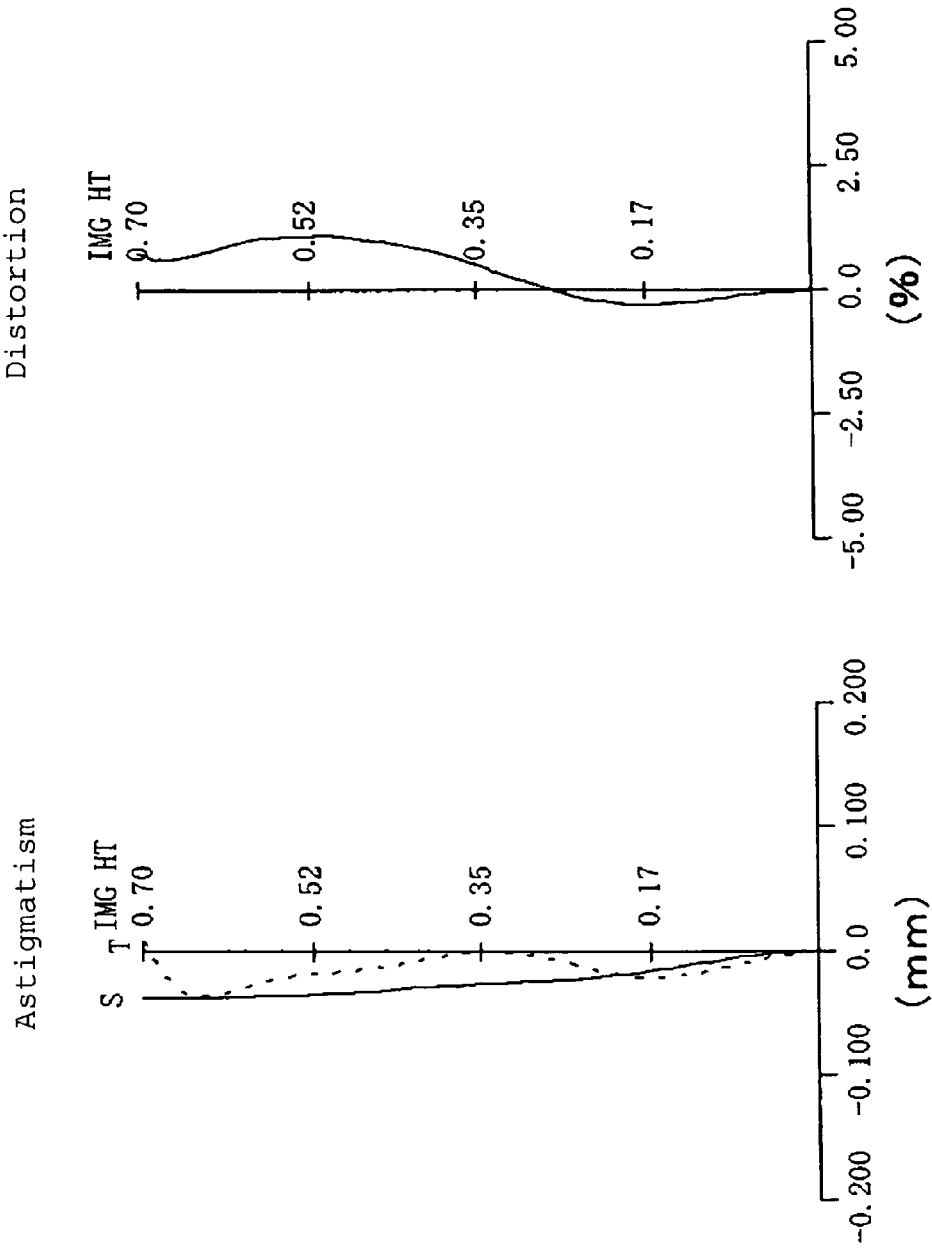

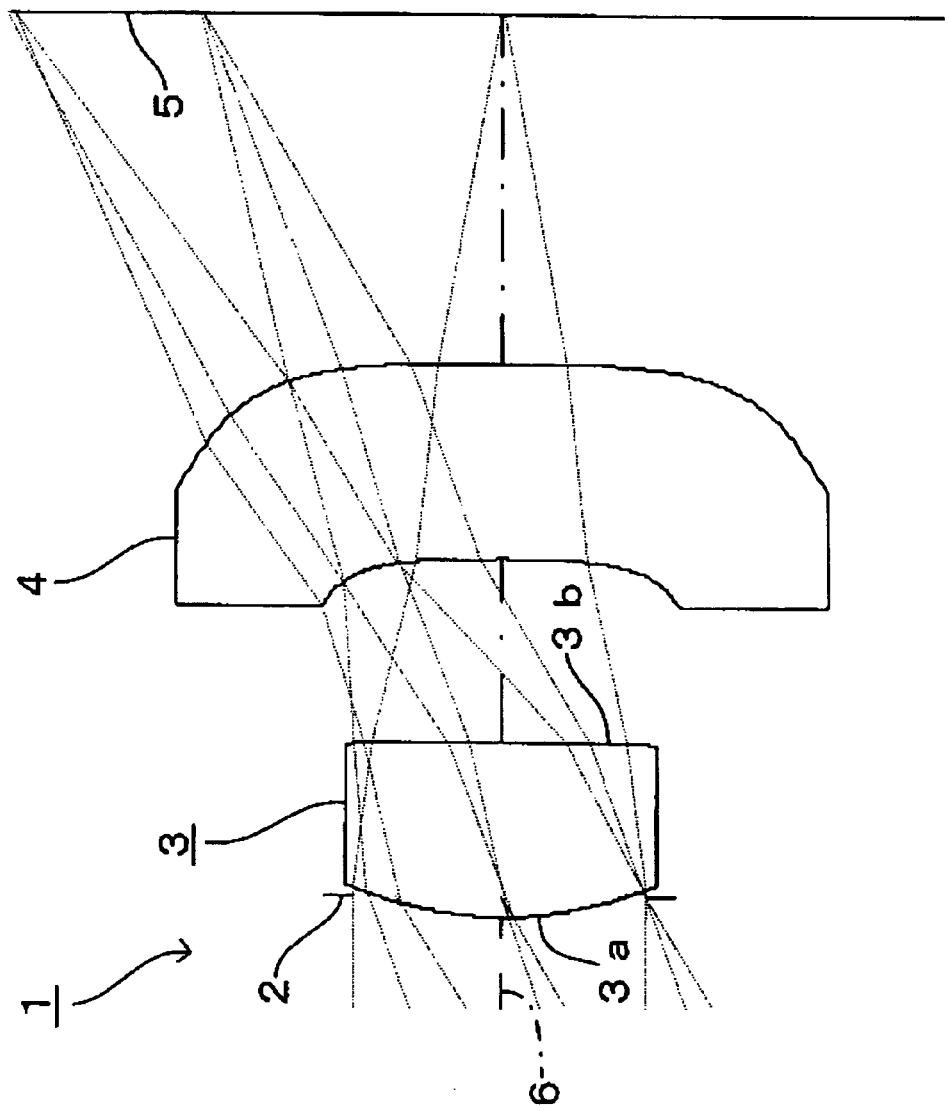

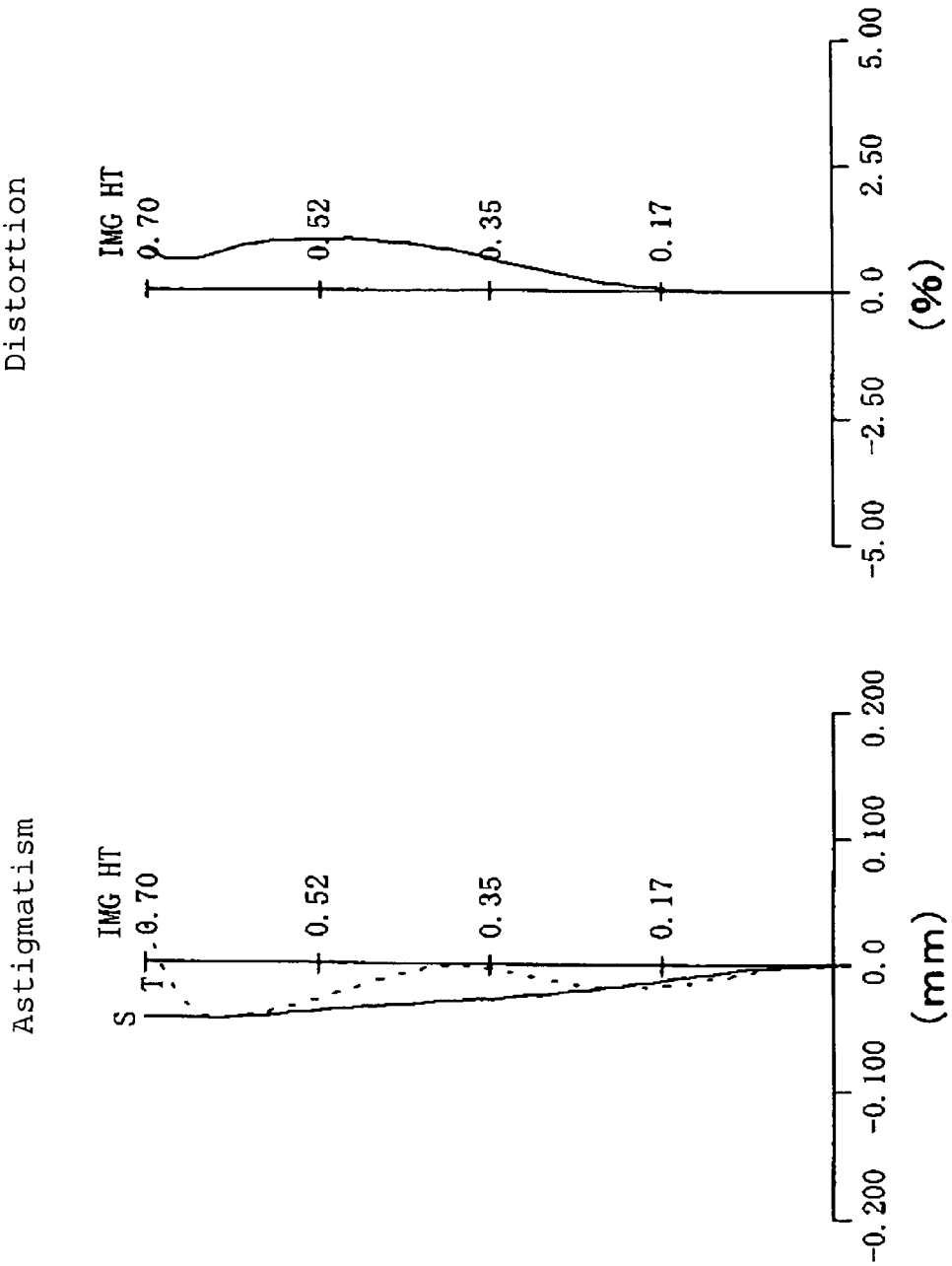
[Fig.19]

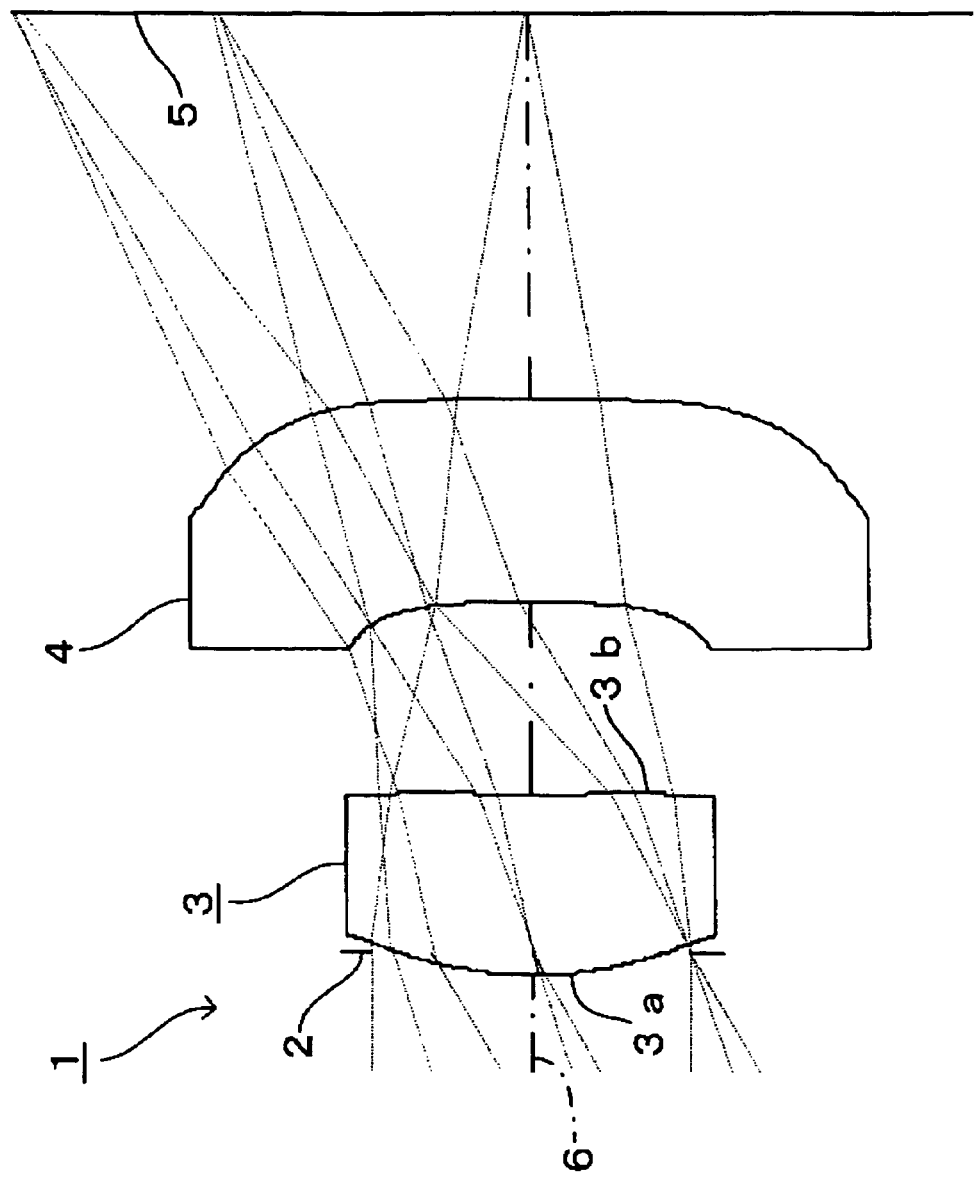

[Fig.21]
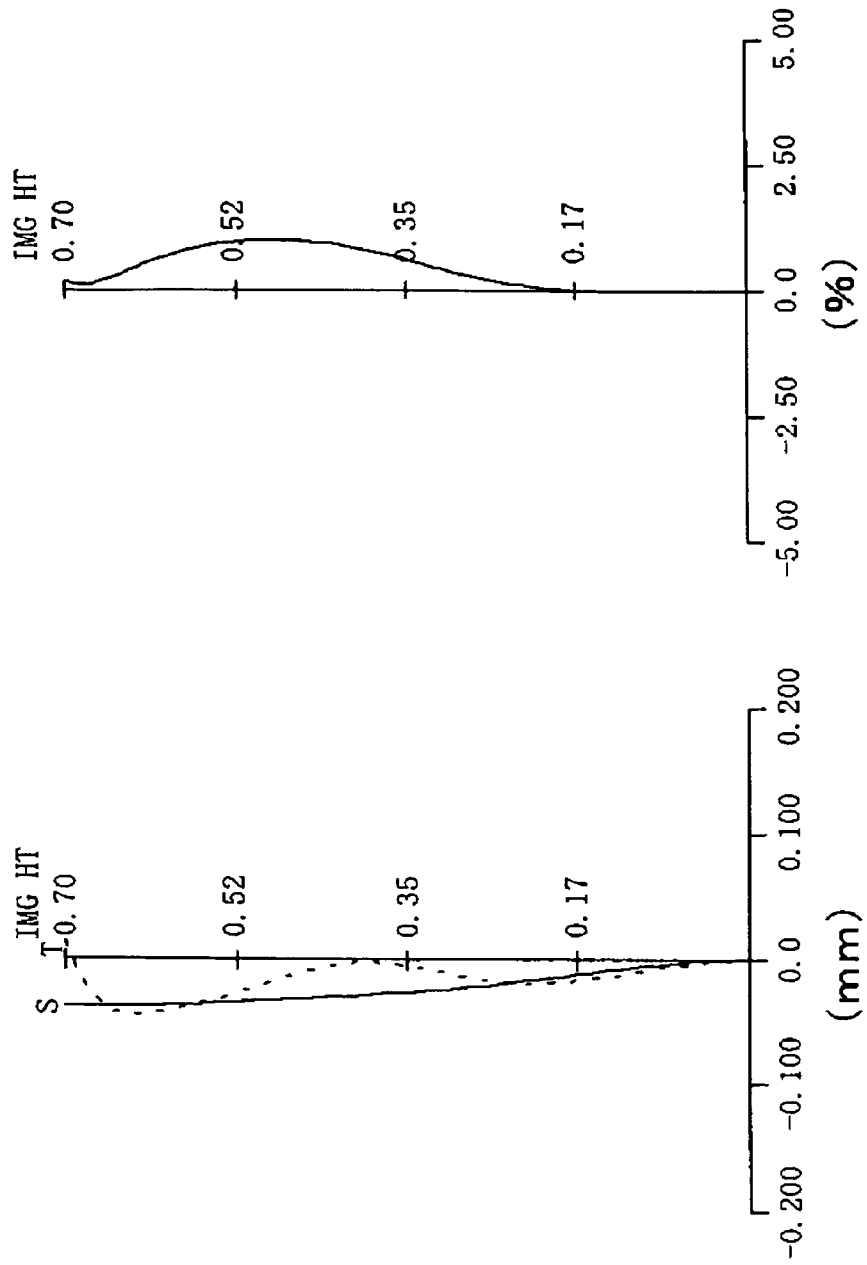

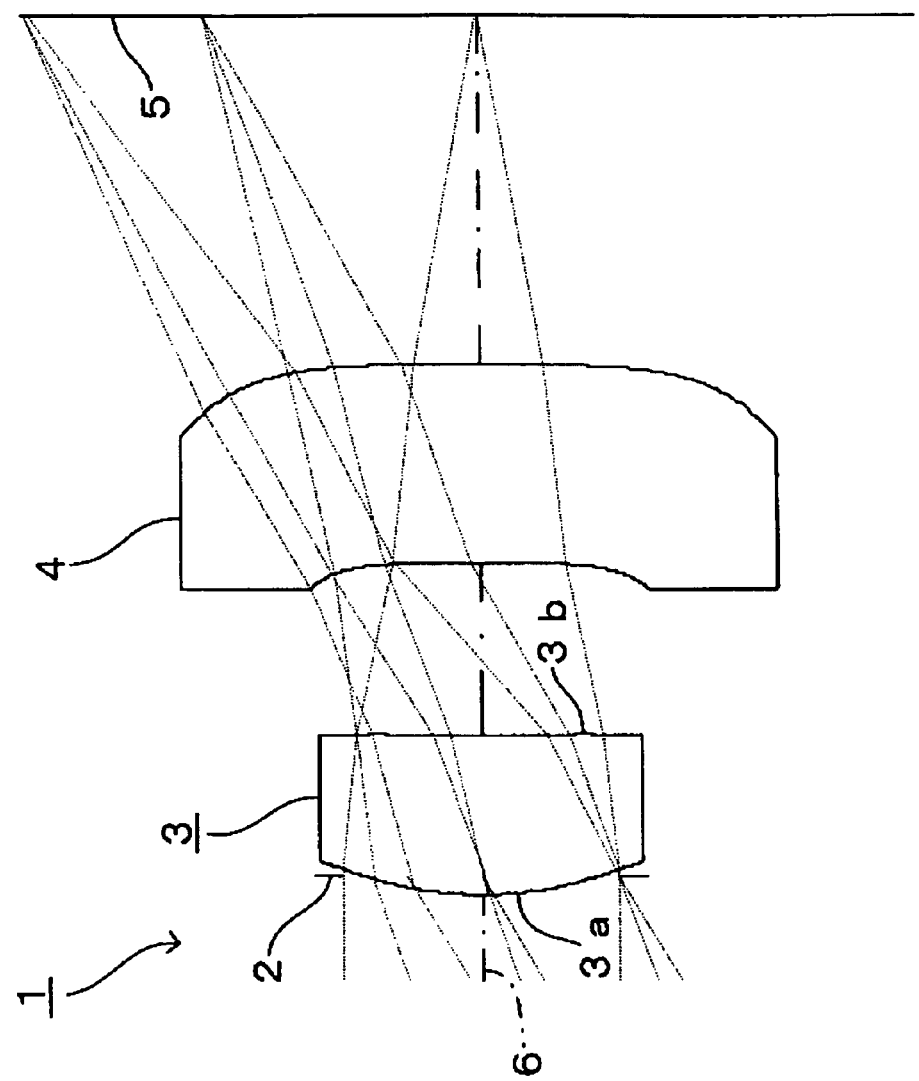

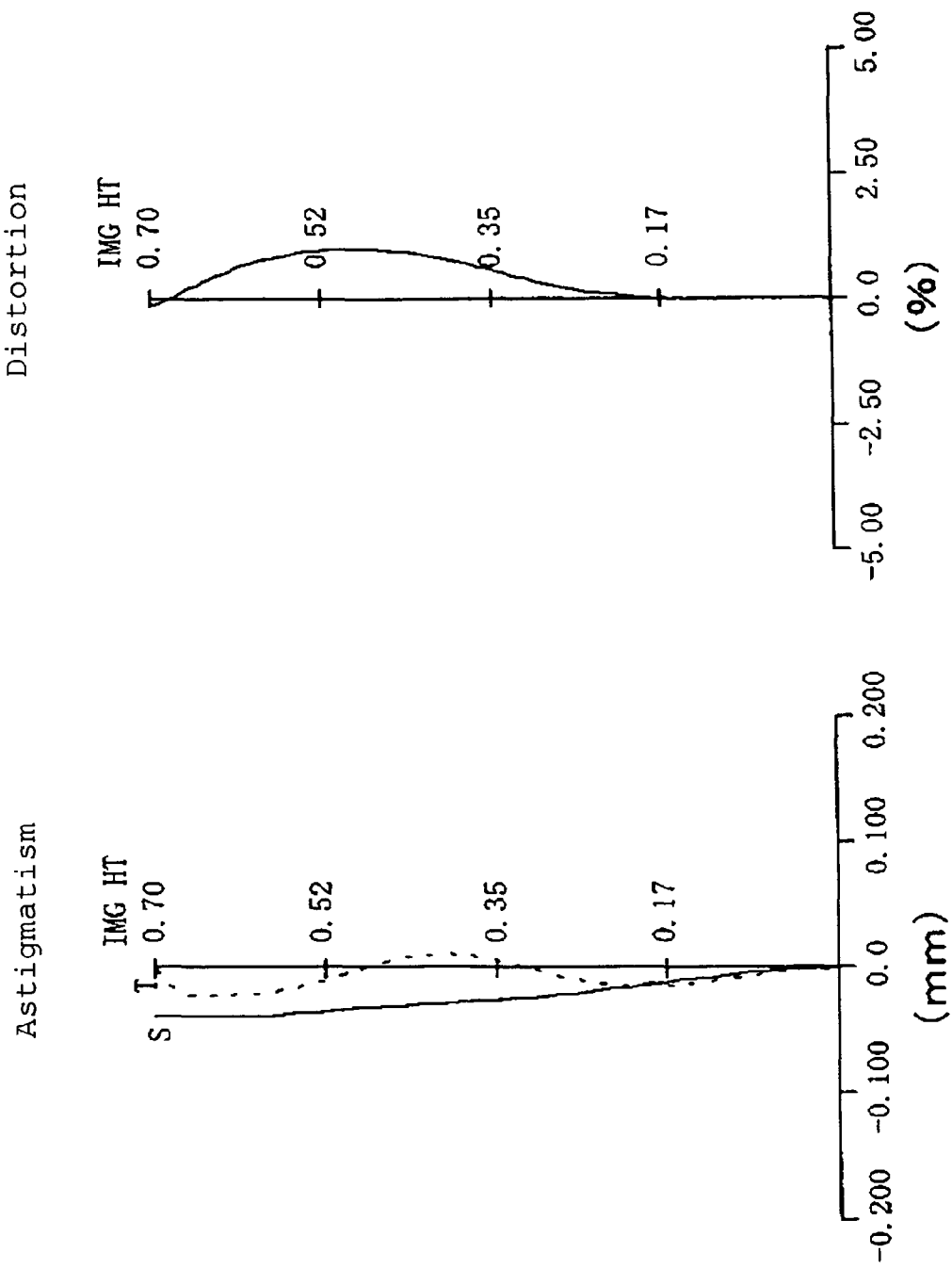

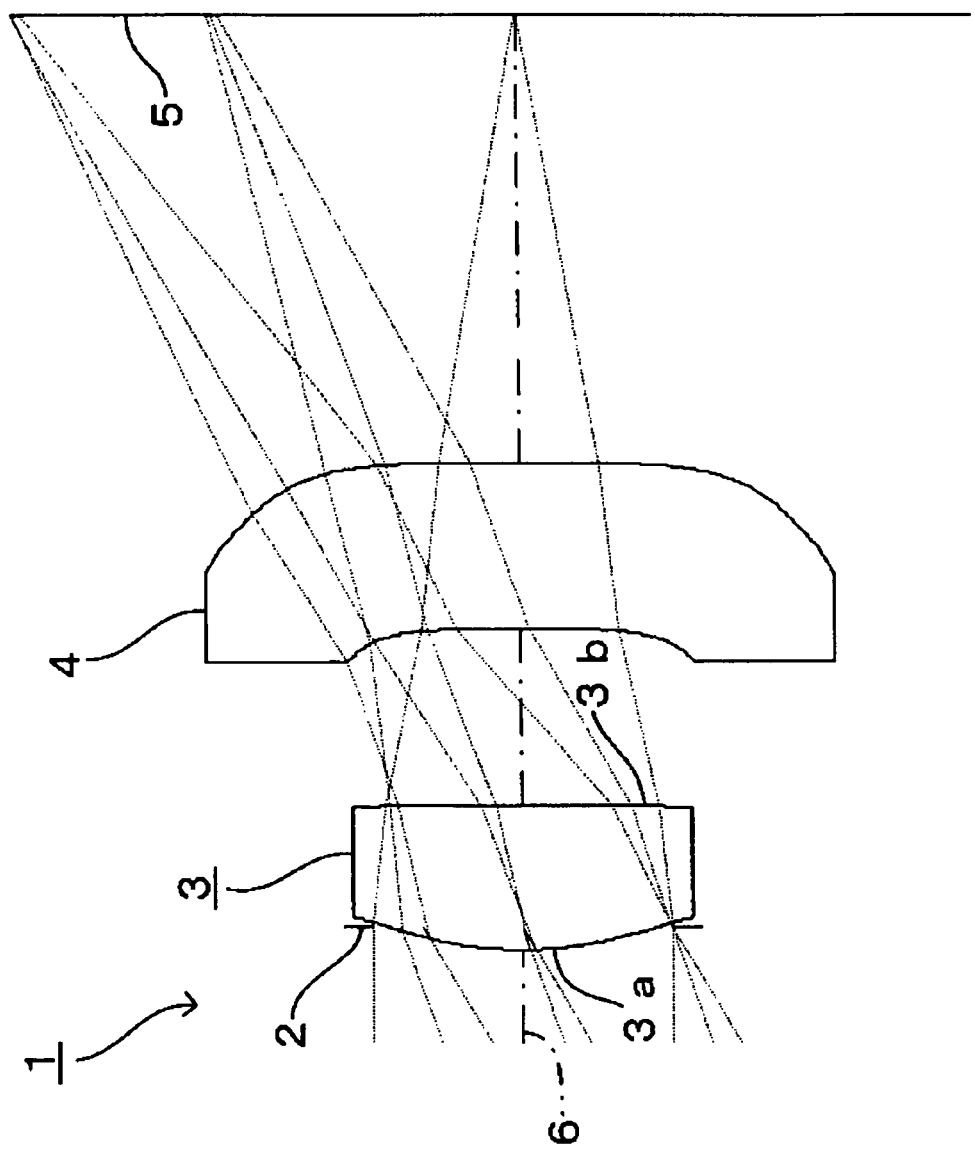
[Fig.24]

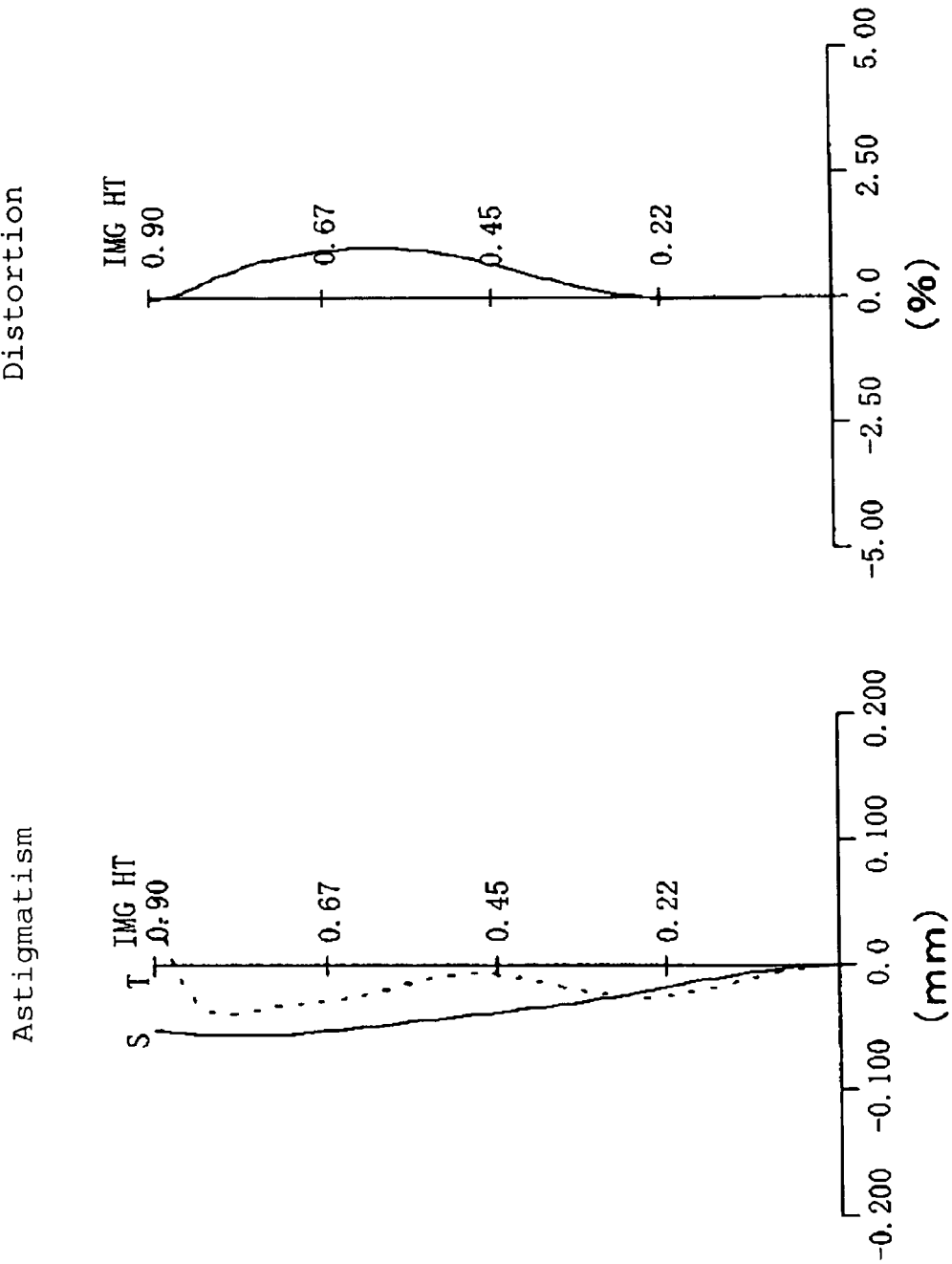
[Fig.25]

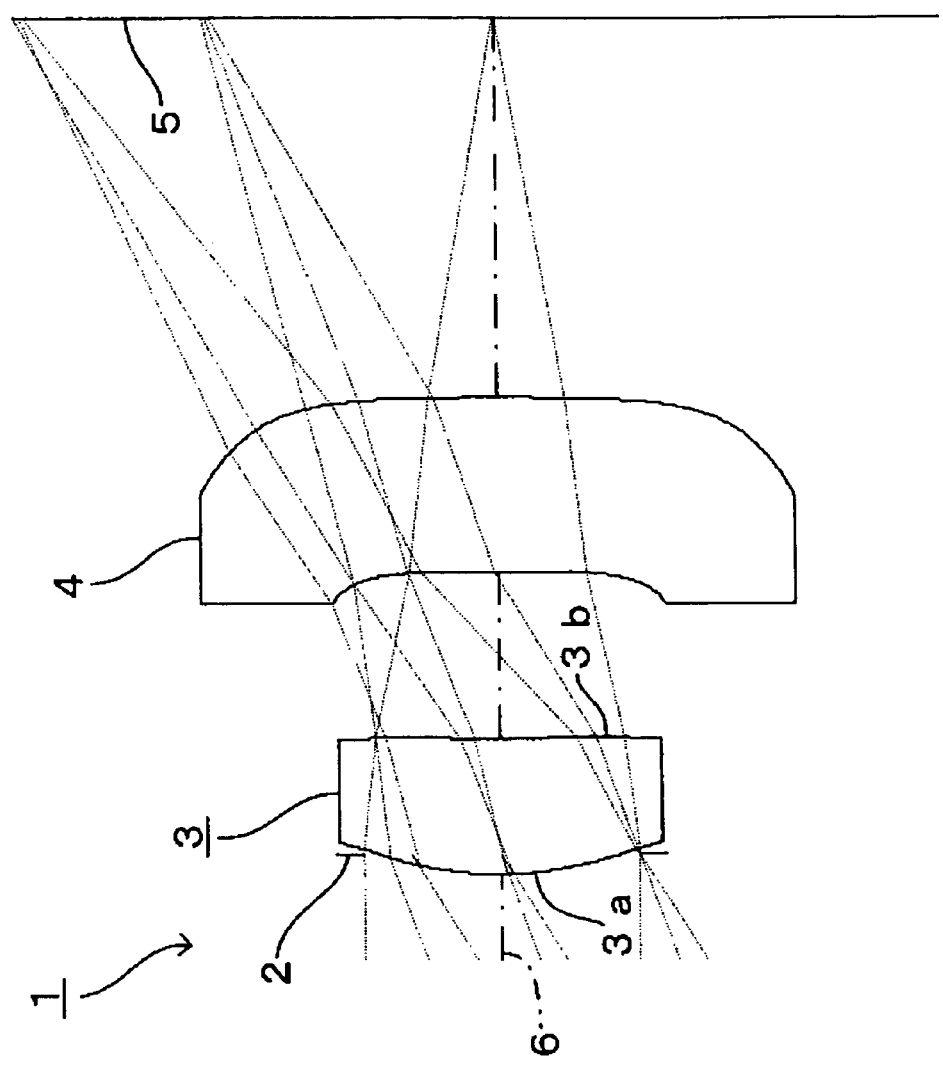

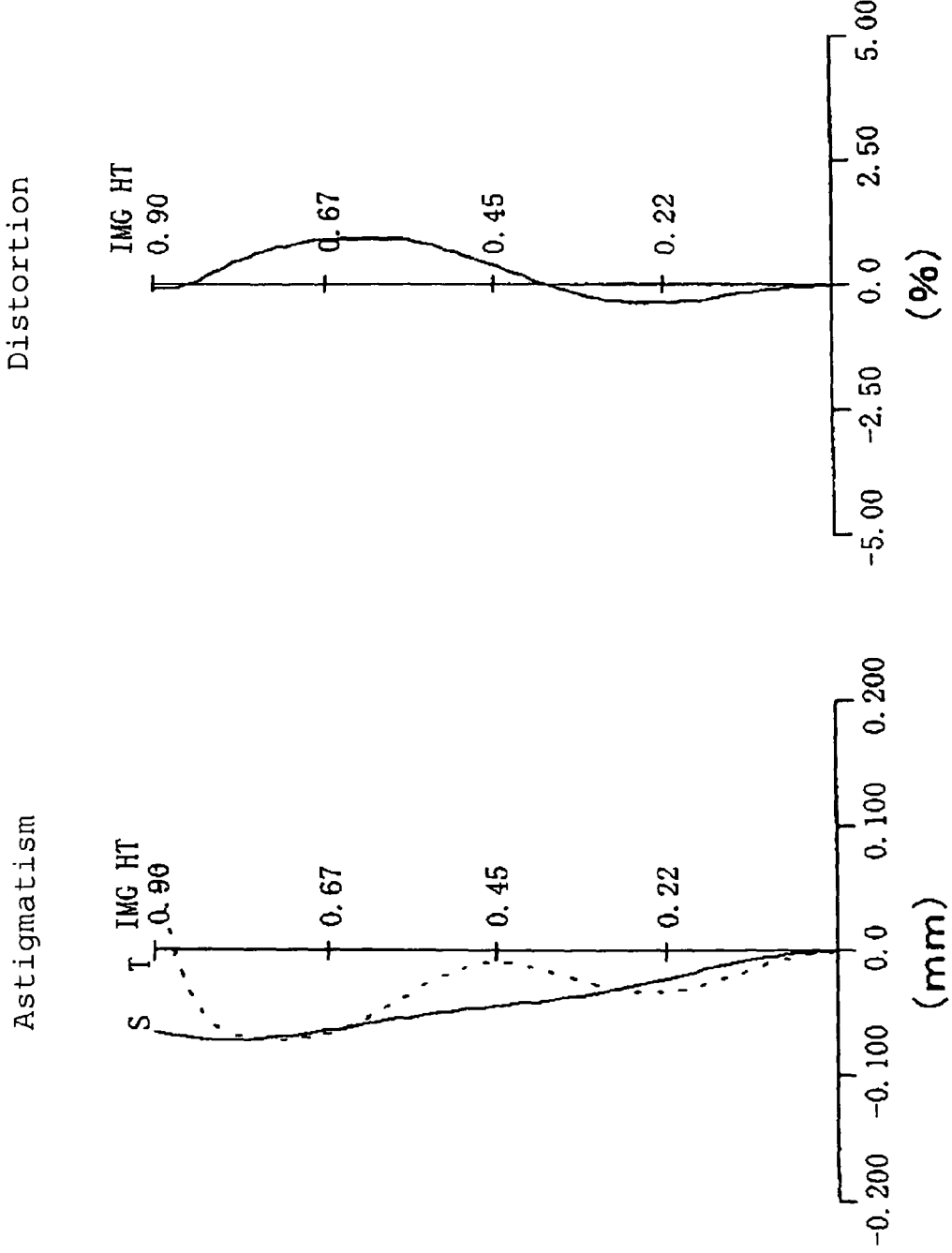

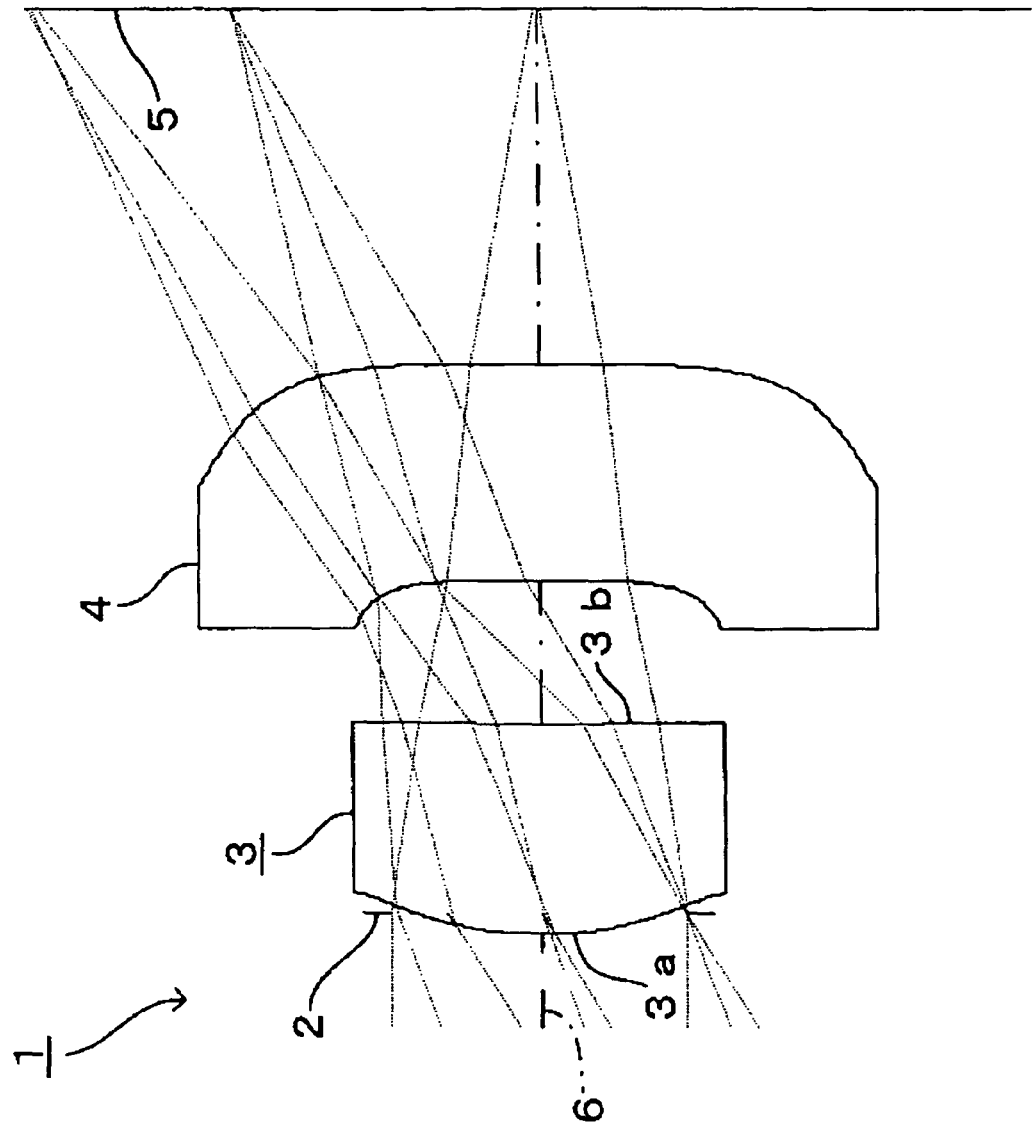

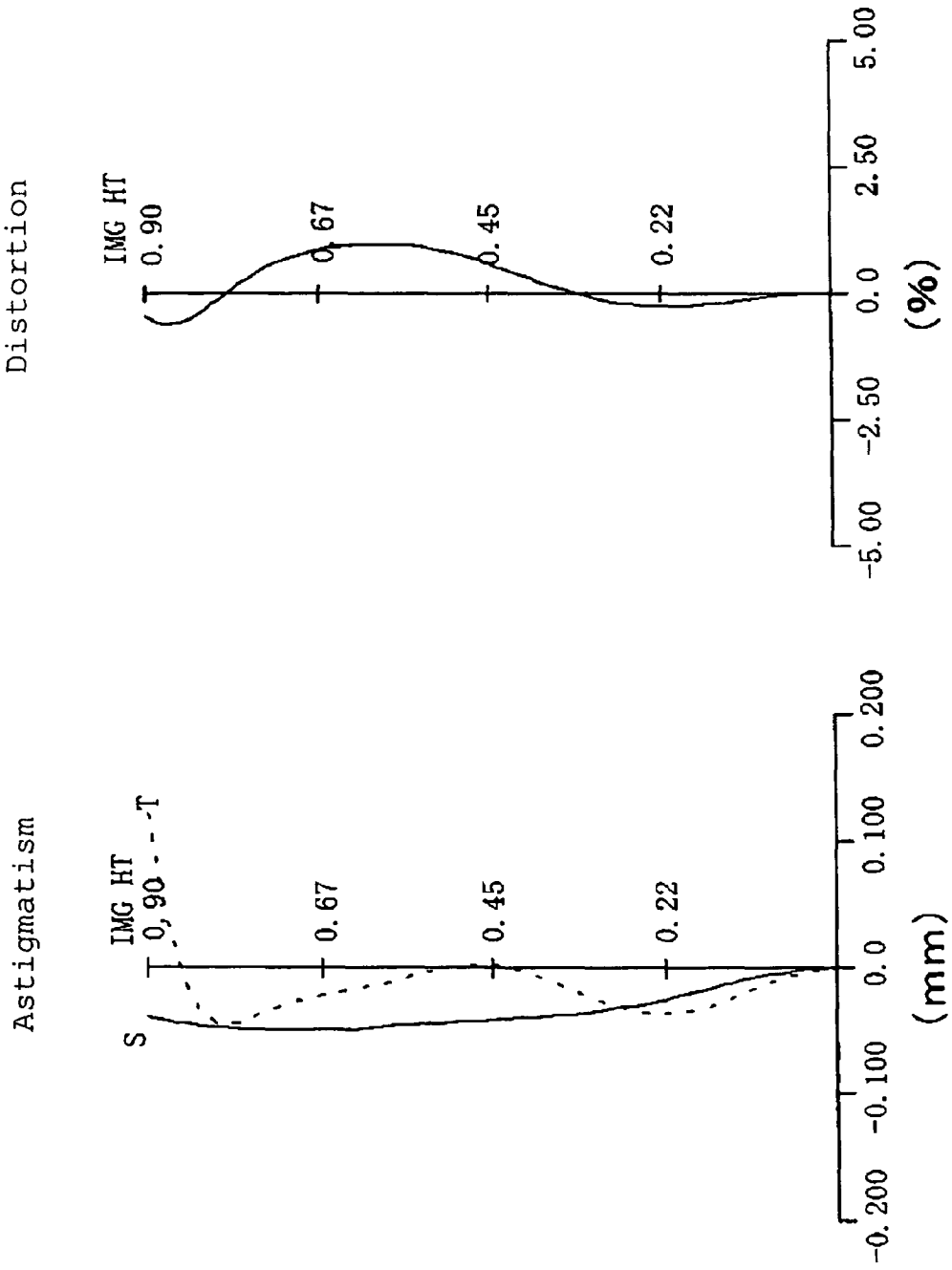

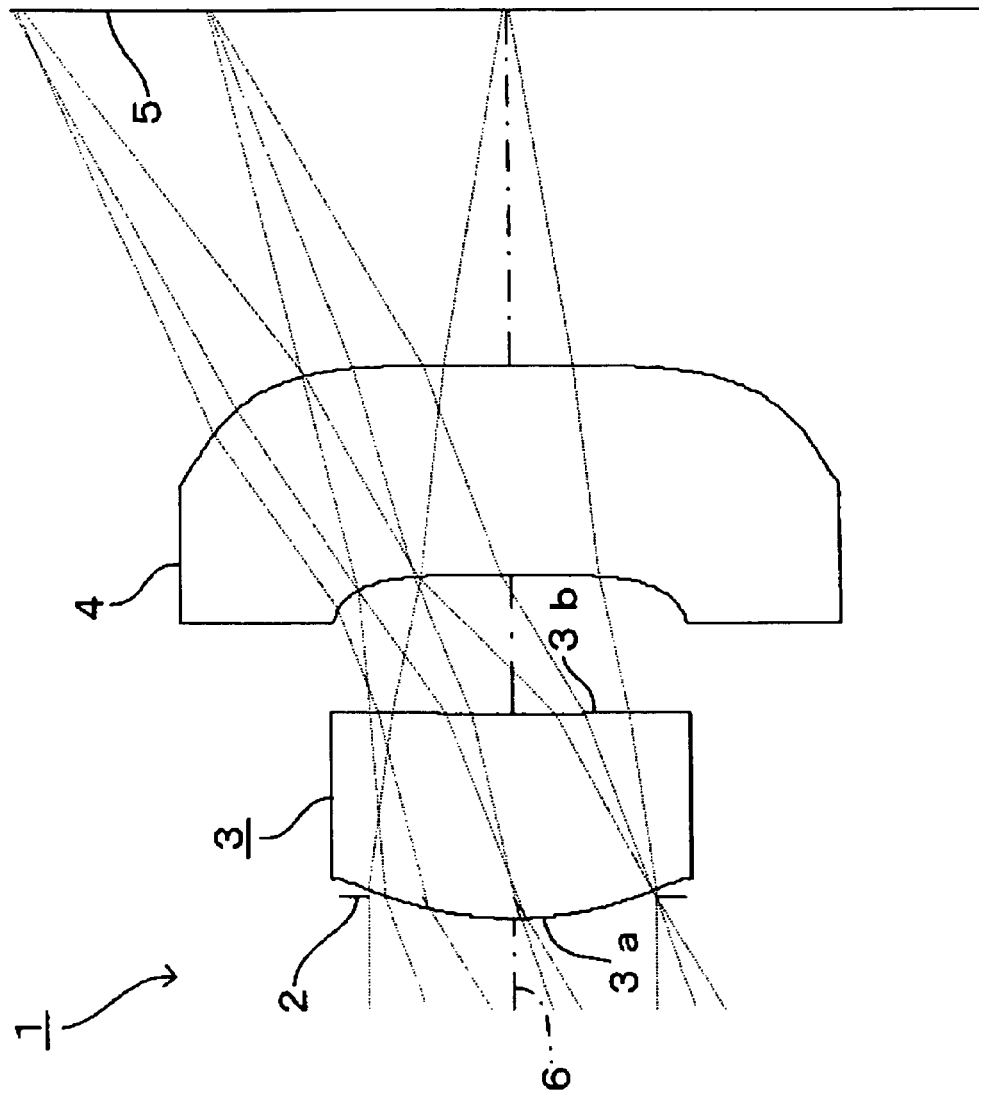

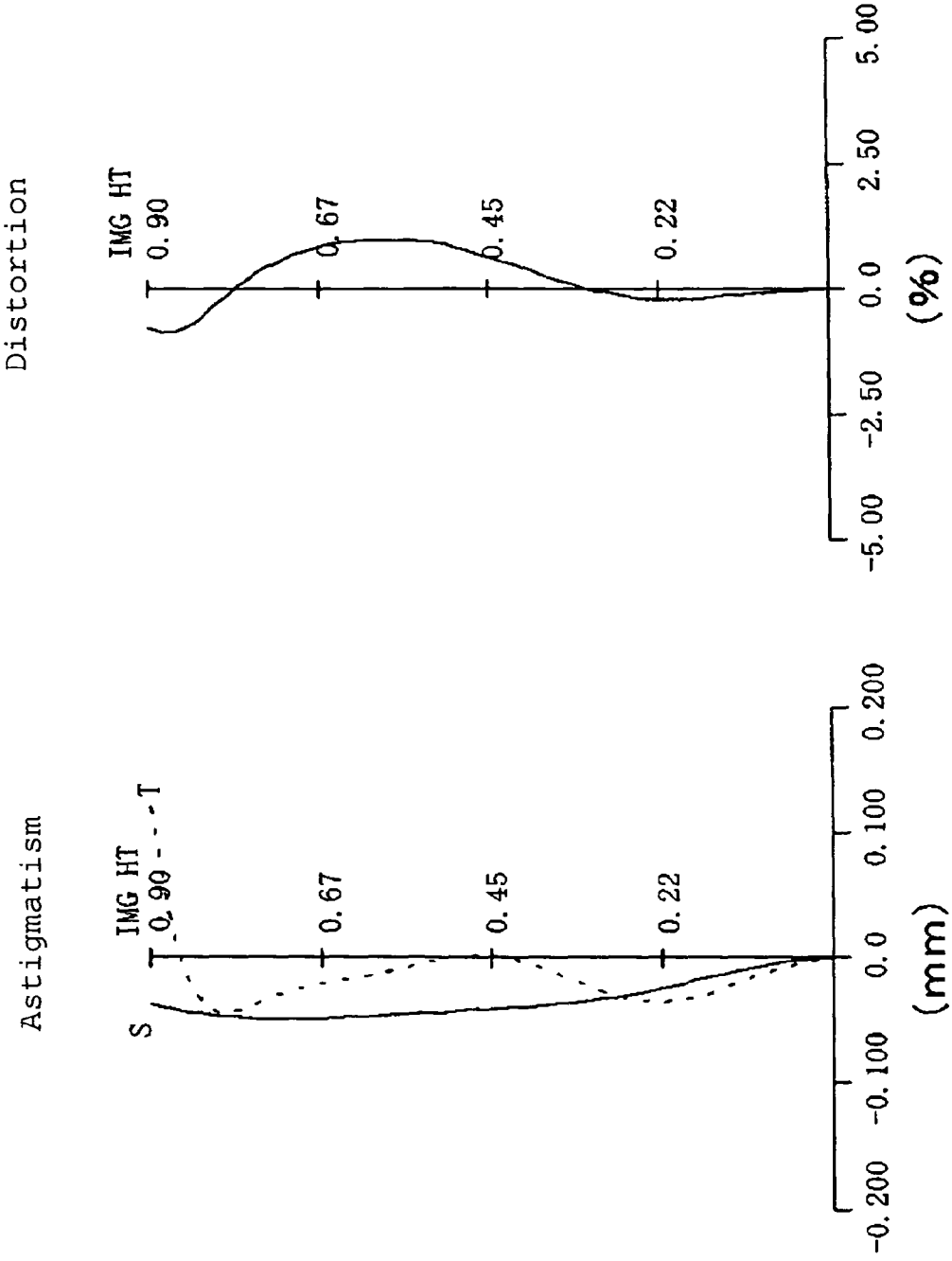
[Fig.31]

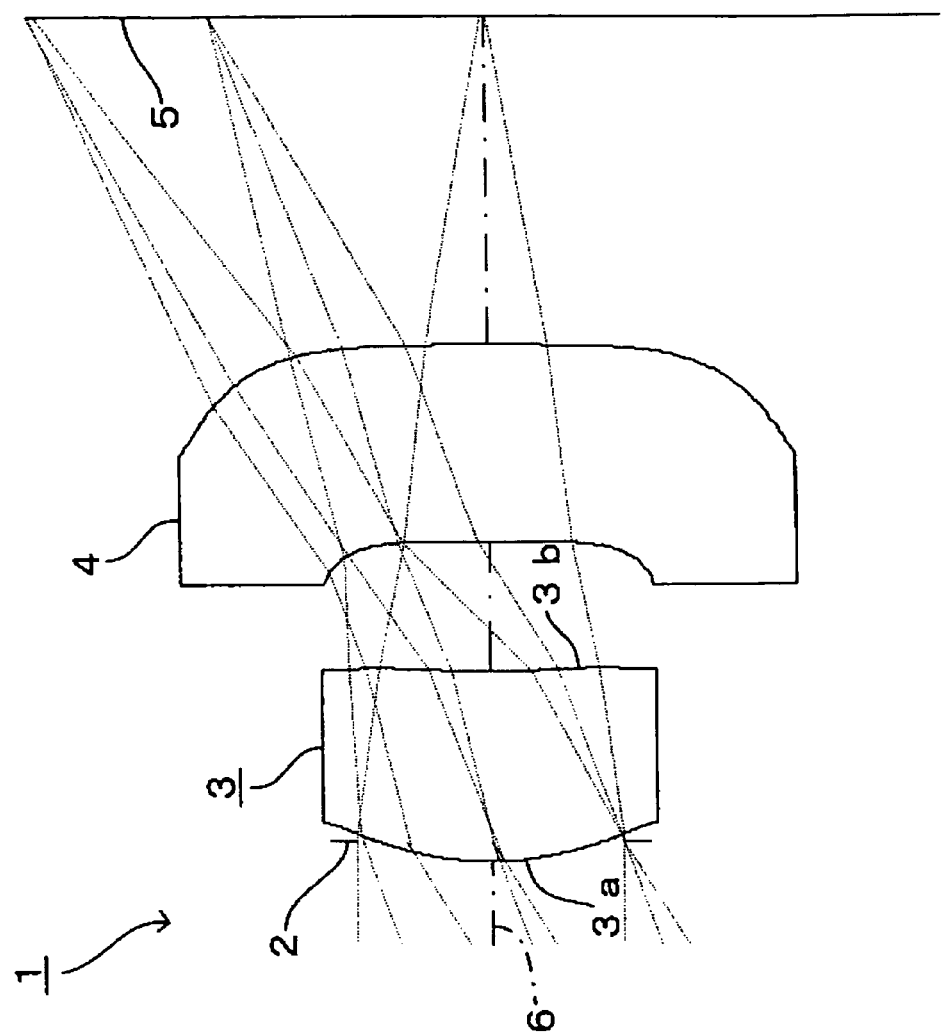
[Fig.32]

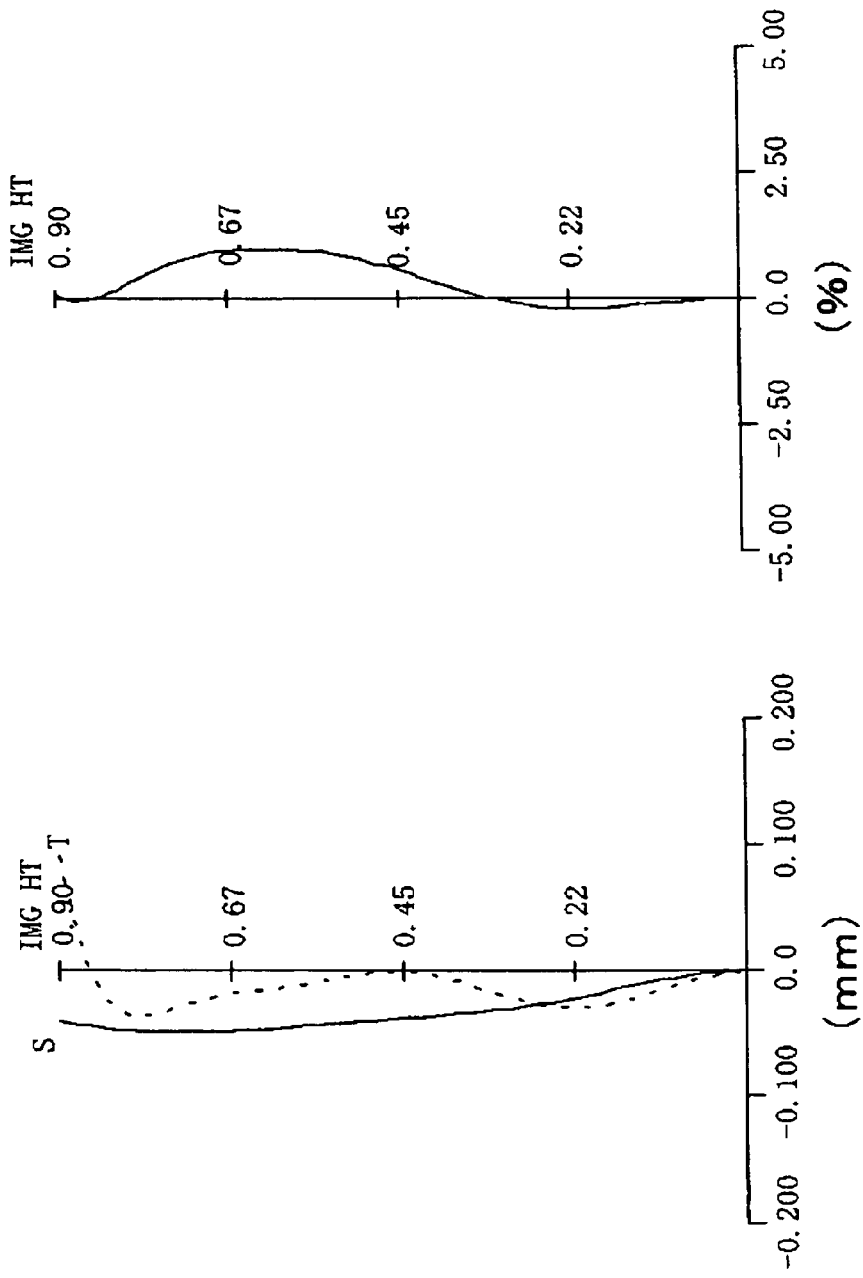
[Fig.33]

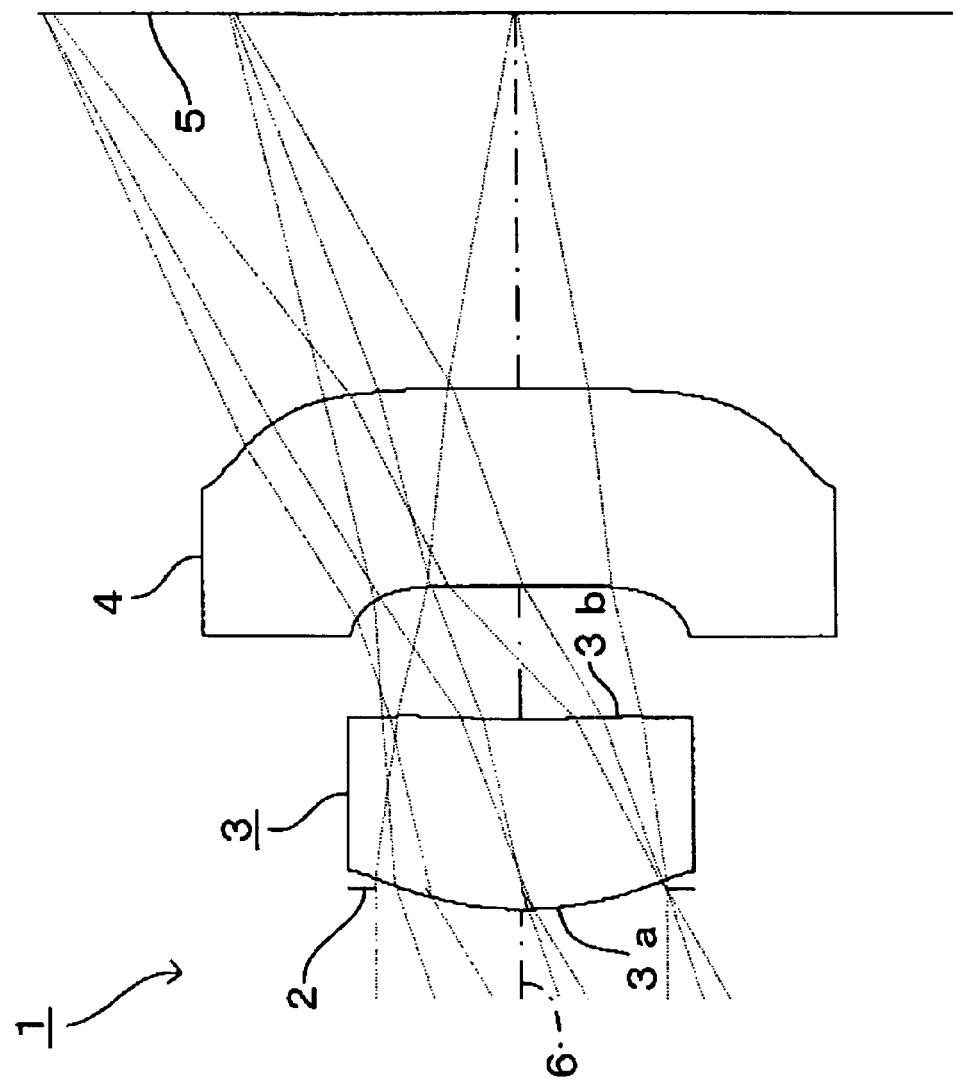

[Fig.35]
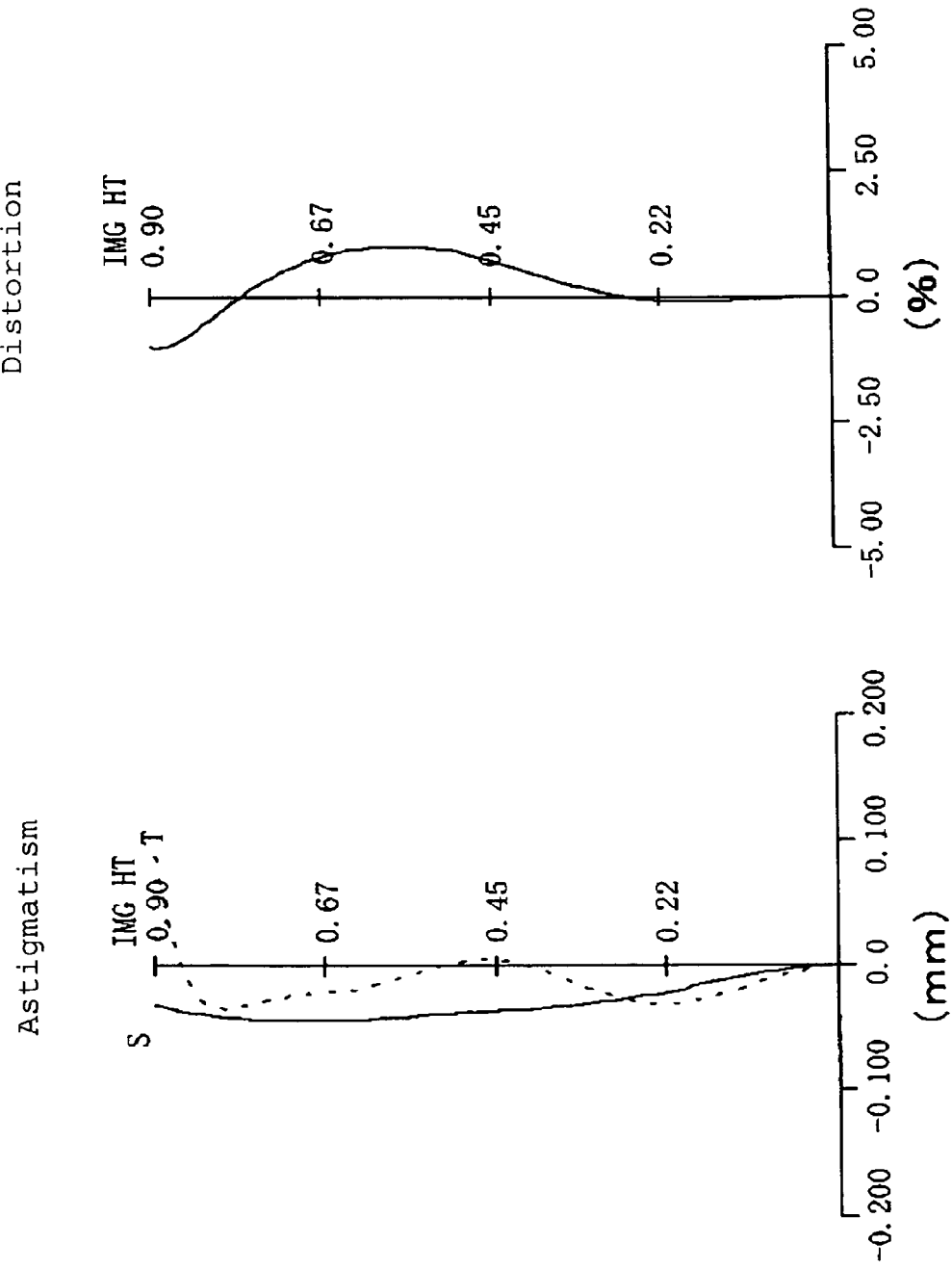

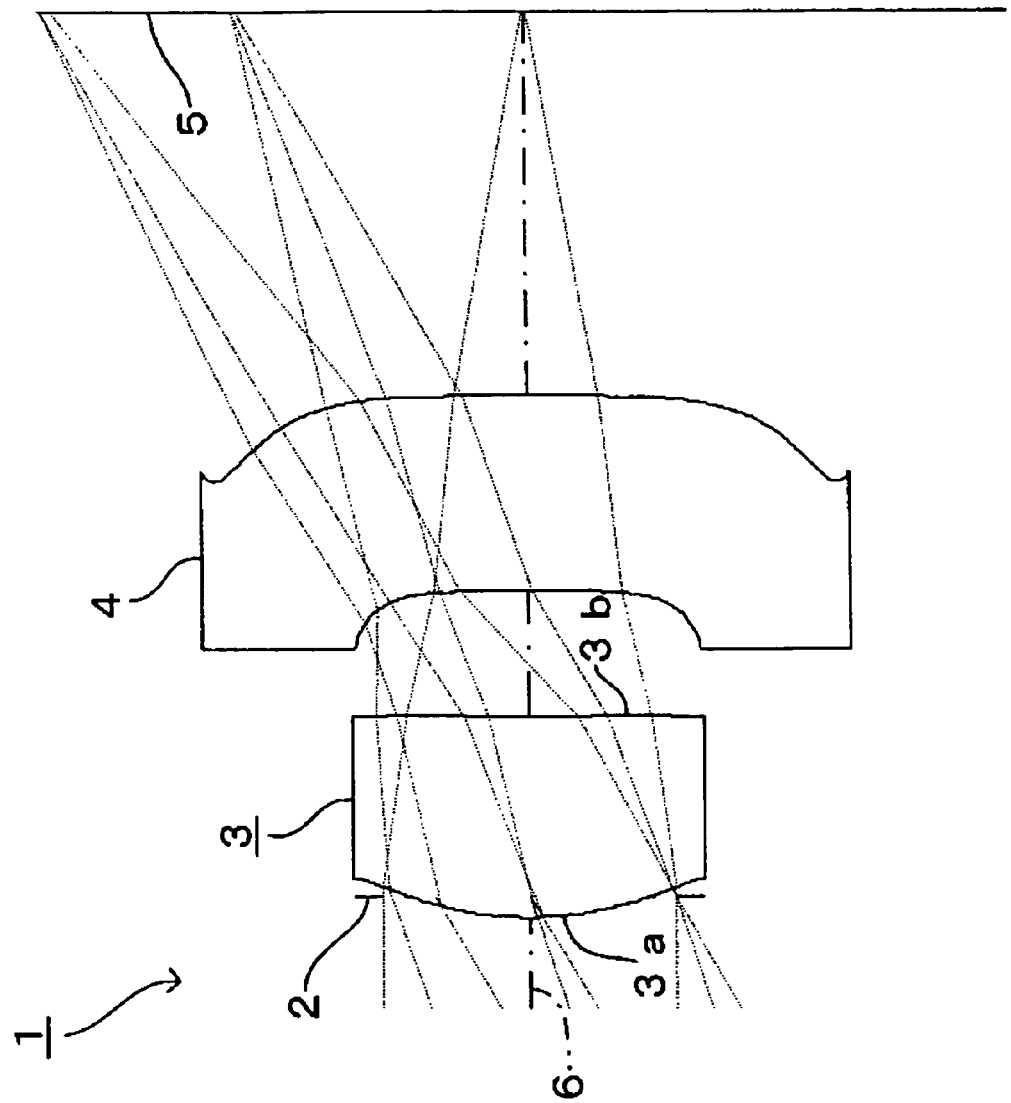
[Fig.36]

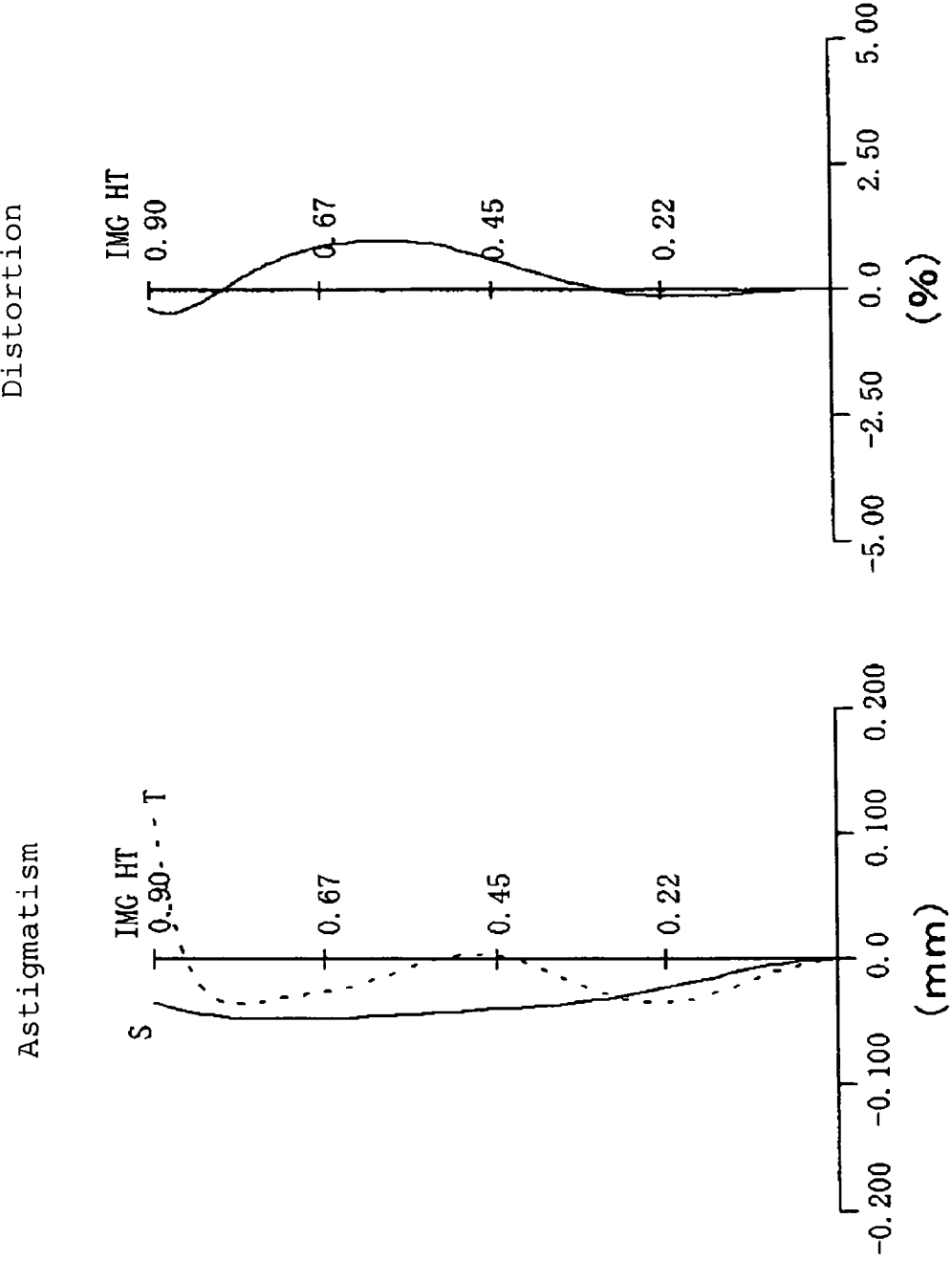

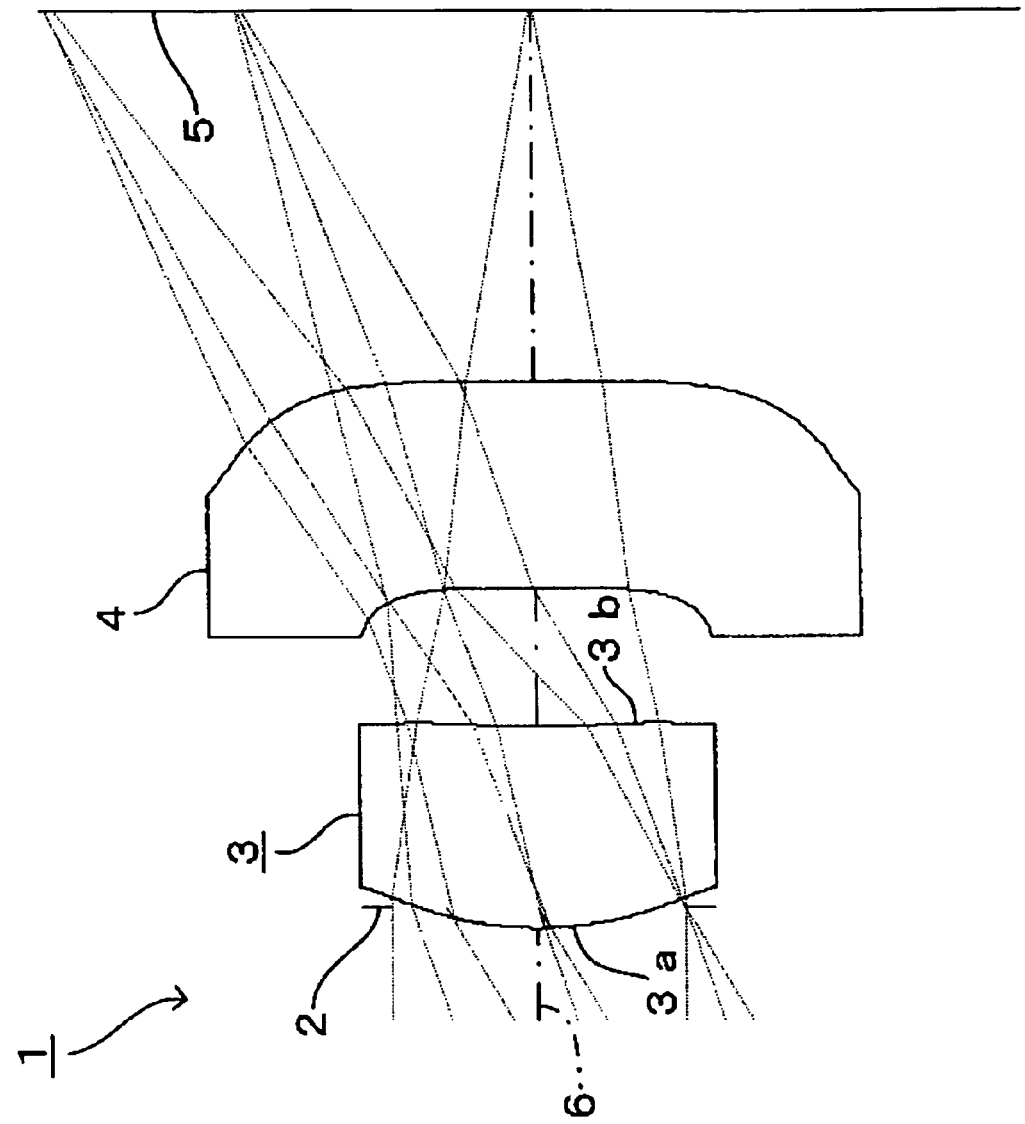

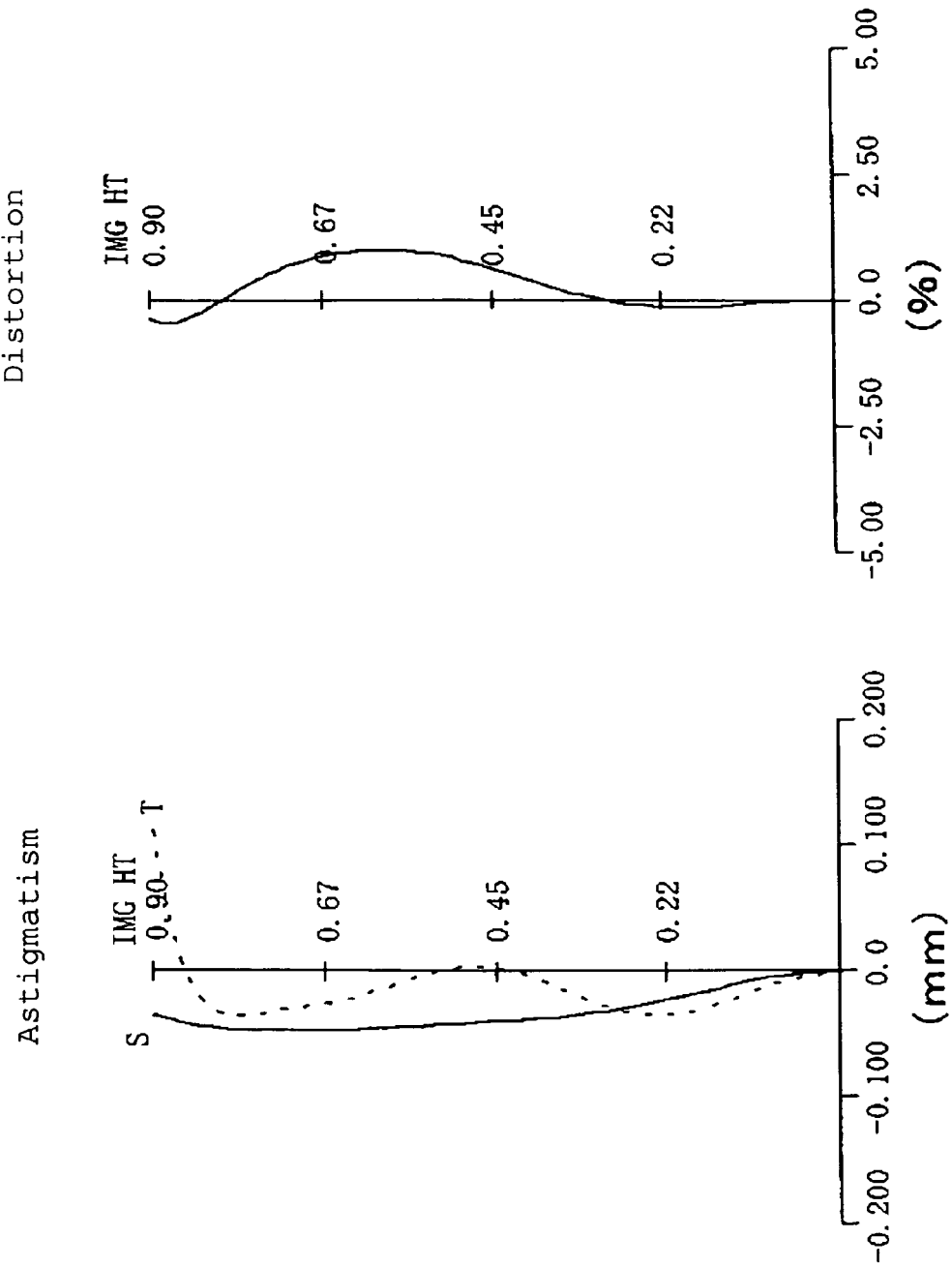
[Fig.39]

IMAGING LENS

BACKGROUND OF THE INVENTION

1. Field of the Invention

The present invention relates to an imaging lens. In particular, the present invention relates to an imaging lens of a two-lens structure that is capable of reducing size and weight and enhancing optical performance. The imaging lens is used for an image-taking device that forms an image of an object, such as scenery and human figures, on an image-taking surface of a solid image pickup element such as a CCD, CMOS, etc. The solid image pickup element is mounted on a portable computer, a television phone, a portable phone, and the like.

2. Description of the Related Art

Recently, there has been an increasing demand for cameras that utilize a solid image pickup element, such as a CCD, CMOS, or the like, which is mounted on a portable phone, a portable computer, and a television phone, for example. It is demanded that a camera such as this is small and light because the camera is required to be mounted on a limited installation space.

Further, in recent years, there has been an increasing demand for a high-optical-performance lens system capable of sufficiently utilizing resolution capabilities of a solid image pickup element having a high resolution exceeding one million pixels. Achieving a balance between size and weight reduction and improvement in optical performance is becoming increasingly important.

From this perspective, a two-lens structure lens system that is smaller and lighter than a three-lens structure lens system and superior to a single-lens structure lens system in optical performance is advantageous. Lens systems, such as those described in Patent Literatures 1 to 5, have been proposed as such two-lens structure lens systems.

[Patent Literature 1] Japanese Patent Unexamined Publication No. 2004-252067 (Especially, see FIRST EXAMPLE)

[Patent Literature 2] Japanese Patent Unexamined Publication No. 2004-177628 (Especially, see FIRST EXAMPLE to THIRD EXAMPLE)

[Patent Literature 3] Japanese Patent Publication No. 4074203 (Especially, See FIRST EXAMPLE)

[Patent Literature 4] Japanese Patent Publication No. 4071817

[Patent Literature 5] Japanese Patent Publication No. 4064434

[Patent Literature 6] Japanese Patent Unexamined Publication No. 2004-170460

DISCLOSURE OF THE INVENTION

Problems to be Solved the Invention

However, the lens systems described in Patent Literature 1 to Patent Literature 3 are disadvantageous in that a second lens is a lens having positive power, and effective aberration correction through combination of powers of a first lens and the second lens is difficult to achieve.

Furthermore, the lens systems described in Patent Literature 4 to Patent Literature 6 are disadvantageous in that balance between curvature of an object side surface of the first lens and curvature of an image surface side surface of the first lens is poor, making it difficult to achieve both size and weight reduction and maintenance of high optical performance.

The present invention has been achieved in light of the above-described problems. An object of the invention is to provide an imaging lens having improved optical performance while being reduced in size and weight.

SUMMARY OF THE INVENTION

In order to achieve the aforementioned object, an imaging lens according to a first aspect of the present invention is an imaging lens used for forming an image of an object on an image-taking surface of a solid image pickup element comprising, in order from an object side to an image surface side: a diaphragm, a first lens that is a meniscus lens having a positive power whose convex surface faces the object side, and a second lens that is a lens having a negative power whose concave surface faces the object side, wherein a condition expressed by the following expression (1) is to be satisfied:

$$0.05 \leq r_1/r_2 \leq 0.29 \qquad (1)$$

where, $r_1$: center radius curvature of the object side face of the first lens $r_2$: center radius curvature of the image surface side face of the first lens.

In the invention, when the diaphragm is disposed closest to the object side, positioning of the diaphragm in a same position in an optical axis direction as a point on the optical axis (referred to, hereinafter, as a surface apex) of a surface (convex surface) of the first lens on the object side cannot be avoided. In addition, the surface apex and surrounding area of the surface of the first lens on the object side passing through the diaphragm and being positioned (projecting) closer to the object side than the diaphragm cannot be avoided. Even in this instance, because the diaphragm is physically positioned closer to the object side than the overall first lens, the configuration does not depart from the description in the scope of claims. To reduce the size of the optical system, the diaphragm is preferably positioned closer to the image surface side than the surface apex of the surface of the first lens on the object side.

In the first aspect of the invention, the diaphragm is disposed closest to the object side. The first lens is a positive meniscus lens that is convex on the object side. The second lens is a negative lens whose concave surface faces the object side. In addition, the condition expressed by the expression (1) is satisfied. Therefore, telecentricity can be ensured, aberration can be effectively corrected, and optical performance can be improved while achieving size and weight reduction.

In an imaging lens according to a second aspect is the imaging lens according to the first aspect, wherein, further, a condition expressed by a following expression (2) is further satisfied:

$$0.4 \leq r_1/FL \leq 0.5 \qquad (2)$$

where,

FL: focal distance of the entire lens system.

In the second aspect of the invention, the expression (2) is further satisfied. Therefore, excellent balance can be achieved among size and weight reduction, improvement in optical performance, and improvement in productivity. Productivity, herein, means not only the productivity for mass-producing the imaging lens (such as moldability and cost when the imaging lens is mass-produced by injection molding), but also easiness of processing, manufacture, etc. of equipment used for manufacturing the imaging lens (such as easiness of processing a mold used for injection molding) (the same applies hereinafter).

In an imaging lens according to a third aspect is the imaging lens according to the first aspect, wherein, further, a condition expressed by a following expression (3) is further satisfied:

$$0.85 \leq f_1/FL \leq 1 \tag{3}$$

where, $f_1$: focal distance of the first lens
FL: focal distance of the entire lens system.

In the third aspect of the invention, the expression (3) is further satisfied. Therefore, excellent balance can be further achieved between size and weight reduction and improvement in optical performance.

In an imaging lens according to a fourth aspect is the imaging lens according to the first aspect, wherein, further, a condition expressed by a following expression (4) is further satisfied:

$$0.65 \leq d_2/d_1 \leq 1.25 \tag{4}$$

where, $d_1$: center thickness of the first lens
$d_2$: distance between the first lens and the second lens on the optical axis.

In the fourth aspect of the invention, the expression (4) is further satisfied. Therefore, a means for effectively blocking unnecessary light can be appropriately employed while maintaining productivity.

In an imaging lens according to a fifth aspect is the imaging lens according to the first aspect, wherein, further, a condition expressed by a following expression (5) is further satisfied:

$$0.65 \leq d_2/d_3 \leq 1.1 \tag{5}$$

where, $d_2$: distance between the first lens and the second lens on the optical axis
$d_3$: center thickness of the second lens.

In the fifth aspect of the invention, the expression (5) is further satisfied. Therefore, a means for effectively blocking unnecessary light can be appropriately employed while maintaining productivity.

In an imaging lens according to a sixth aspect is the imaging lens according to the first aspect, wherein, further, a condition expressed by a following expression (6) is further satisfied:

$$0.1 \leq d_1/FL \leq 0.3 \tag{6}$$

where, $d_1$: center thickness of the first lens
FL: focal distance of the entire lens system.

In the sixth aspect of the invention, the expression (6) is further satisfied. Therefore, excellent balance can be achieved between size and weight reduction and maintenance of productivity.

In an imaging lens according to a seventh aspect is the imaging lens according to the first aspect, wherein, further, a condition expressed by a following expression (7) is further satisfied:

$$0.1 \leq d_3/FL \leq 0.3 \tag{7}$$

where, $d_3$: center thickness of the second lens
FL: focal distance of the entire lens system.

In the seventh aspect of the invention, the expression (7) is further satisfied. Therefore, productivity can be maintained while reducing size and In an imaging lens according to a eighth aspect is the imaging lens according to the first aspect, a condition expressed by a following expression (8) is further satisfied:

$$0.9 \leq L/FL \leq 1.2 \tag{8}$$

where,

L: entire length of the lens system (distance from the surface closest positioned closest to the object side to the image taking surface on the optical axis [air reduced length])
FL: focal distance of the entire lens system.

In the eighth aspect of the invention is the expression (8) is further satisfied. Therefore, balance can be achieved between size and weight reduction and maintenance of productivity.

Effects of the Invention

With the imaging lens according to the present invention, optical performance can be improved while achieving size and weight reduction.

BRIEF DESCRIPTION OF THE DRAWINGS

FIG. 1 is a schematic diagram for showing an embodiment of the imaging lens according to the present invention;

FIG. 2 is a schematic diagram for showing FIRST EXAMPLE of the imaging lens according to the present invention;

FIG. 3 shows graphs for describing the astigmatism and distortion of the imaging lens shown in FIG. 2;

FIG. 4 is a schematic diagram for showing SECOND EXAMPLE of the imaging lens according to the present invention;

FIG. 5 shows graphs for describing the astigmatism and distortion of the imaging lens shown in FIG. 4;

FIG. 6 is a schematic diagram for showing THIRD EXAMPLE of the imaging lens according to the present invention;

FIG. 7 shows graphs for describing the astigmatism and distortion of the imaging lens shown in FIG. 6;

FIG. 8 is a schematic diagram for showing FOURTH EXAMPLE of the imaging lens according to the present invention;

FIG. 9 shows graphs for describing the astigmatism and distortion of the imaging lens shown in FIG. 8;

FIG. 10 is a schematic diagram for showing FIFTH EXAMPLE of the imaging lens according to the present invention;

FIG. 11 shows graphs for describing the astigmatism and distortion of the imaging lens shown in FIG. 10;

FIG. 12 is a schematic diagram for showing SIXTH EXAMPLE of the imaging lens according to the present invention;

FIG. 13 shows graphs for describing the astigmatism and distortion of the imaging lens shown in FIG. 12;

FIG. 14 is a schematic diagram for showing SEVENTH EXAMPLE of the imaging lens according to the present invention;

FIG. 15 shows graphs for describing the astigmatism and distortion of the imaging lens shown in FIG. 14;

FIG. 16 is a schematic diagram for showing EIGHTH EXAMPLE of the imaging lens according to the present invention;

FIG. 17 shows graphs for describing the astigmatism and distortion of the imaging lens shown in FIG. 16;

FIG. 18 is a schematic diagram for showing NINTH EXAMPLE of the imaging lens according to the present invention;

FIG. 19 shows graphs for describing the astigmatism and distortion of the imaging lens shown in FIG. 18;

FIG. 20 is a schematic diagram for showing TENTH EXAMPLE of the imaging lens according to the present invention;

FIG. 21 shows graphs for describing the astigmatism and distortion of the imaging lens shown in FIG. 20;

FIG. 22 is a schematic diagram for showing ELEVENTH EXAMPLE of the imaging lens according to the present invention;

FIG. 23 shows graphs for describing the astigmatism and distortion of the imaging lens shown in FIG. 22;

FIG. 24 is a schematic diagram for showing TWELFTH EXAMPLE of the imaging lens according to the present invention;

FIG. 25 shows graphs for describing the astigmatism and distortion of the imaging lens shown in FIG. 24;

FIG. 26 is a schematic diagram for showing THIRTEENTH EXAMPLE of the imaging lens according to the present invention;

FIG. 27 shows graphs for describing the astigmatism and distortion of the imaging lens shown in FIG. 26;

FIG. 28 is a schematic diagram for showing FOURTEENTH EXAMPLE of the imaging lens according to the present invention;

FIG. 29 shows graphs for describing the astigmatism and distortion of the imaging lens shown in FIG. 28;

FIG. 30 is a schematic diagram for showing FIFTEENTH EXAMPLE of the imaging lens according to the present invention;

FIG. 31 shows graphs for describing the astigmatism and distortion of the imaging lens shown in FIG. 30;

FIG. 32 is a schematic diagram for showing SIXTEENTH EXAMPLE of the imaging lens according to the present invention;

FIG. 33 shows graphs for describing the astigmatism and distortion of the imaging lens shown in FIG. 32;

FIG. 34 is a schematic diagram for showing SEVENTEENTH EXAMPLE of the imaging lens according to the present invention;

FIG. 35 shows graphs for describing the astigmatism and distortion of the imaging lens shown in FIG. 34;

FIG. 36 is a schematic diagram for showing EIGHTEENTH EXAMPLE of the imaging lens according to the present invention;

FIG. 37 shows graphs for describing the astigmatism and distortion of the imaging lens shown in FIG. 36;

FIG. 38 is a schematic diagram for showing NINETEENTH EXAMPLE of the imaging lens according to the present invention;

FIG. 39 shows graphs for describing the astigmatism and distortion of the imaging lens shown in FIG. 38;

DETAILED DESCRIPTION OF THE PREFERRED EMBODIMENT

An embodiment of the imaging lens according to the present invention will be described hereinafter by referring to FIG. 1.

As shown in FIG. 1, an imaging lens 1 of the embodiment comprises, in order from an object side toward an image surface side, a diaphragm 2, a first lens 3 made of resin that is a meniscus lens having a positive power whose convex surface faces the object side, and a second lens 4 made of resin that is a lens having a negative power whose concave surface faces the object side.

Herein, each of the lens surfaces on the object side and the image surface side of the first lens 3 and the second lens 4 is respectively referred to as a first face and a second face.

On the second face side of the second lens 4, there are disposed an image-taking surface 5 which is a light-receiving surface of a solid image pickup element such as a CCD or a CMOS, respectively.

Various filters, such as a cover glass, an infrared (IR) cut filter, and a low-pass filter, may be disposed as required between a second face of the second lens 4 and an image-taking surface 5. The IR cut filter may be formed on any one surface such as the second face 3b of the first lens 3 or a plurality of surfaces, among each lens face of the first lens 3 and the second lens 4.

In this way, according to the embodiment, high telecentricity can be ensured as a result of the diaphragm 2 being positioned closest to the object side and an exit pupil position being positioned away from the image-taking surface 5. Therefore, an incidence angle of light incident on a sensor of the solid image pickup element can be relaxed.

According to the embodiment, the second lens 4 is a lens having a negative power, while the first lens 3 is a positive meniscus lens that is convex on the object side. Therefore, effective aberration correction can be achieved through combination of powers between the second lens 4 and the first lens 3.

Moreover, according to the embodiment, a condition expressed by a following expression (1) is satisfied:

$$0.05 \leq r_1/r_2 \leq 0.29 \qquad (1)$$

where, $r_1$ in the expression (1) is center radius curvature of the first face 3a of the first lens 3 (the same applies hereinafter). $r_2$ in the expression (1) is center radius curvature of the second face 3b of the first lens 3 (the same applies hereinafter).

Here, when the value of $r_1/r_2$ is less than the value (0.05) shown in the expression (1), aberration correction effect on a second face 3b of the first lens 3 weakens. Achieving desired optical performance, while ensuring size and weight reduction of the overall optical system, becomes difficult. On the other hand, when the value of $r_1/r_2$ is greater than the value (0.29) shown in the expression (1), the center radius curvatures of both a first face 3a and the second face 3b of the first lens 3 become too small. An injection-molding mold used to manufacture the first lens 3 by injection molding becomes difficult to manufacture. Size and weight reduction of the overall optical system becomes difficult to ensure.

Therefore, according to the embodiment, by the value of $r_1/r_2$ being set to satisfy the expression (1), productivity can be ensured, aberration can be effectively corrected, and optical performance can be improved while achieving size and weight reduction.

It is more preferable for the relation between $r_1$ and $r_2$ to satisfy an expression $0.1 \leq r_1/r_2 \leq 0.25$.

According to a more preferable embodiment, a condition expressed by a following expression (2) is satisfied:

$$0.4 \leq r_1/FL \leq 0.5 \qquad (2)$$

where, FL in the expression (2) is focal distance of the entire lens system (the same applies hereinafter).

Here, when the value of $r_1/FL$ is less than the value (0.4) shown in the expression (2), the center radius curvature of the first lens 3 becomes too small. Therefore, the first lens 3 becomes difficult to manufacture. On the other hand, when the value of $r_1/FL$ is greater than the value (0.5) shown in the expression (2), the overall optical system becomes too large. Size and weight reduction becomes difficult to achieve.

Therefore, by the value of $r_1$/FL being set to satisfy the expression (2), excellent balance can be achieved among size and weight reduction, improvement in optical performance, and improvement in productivity.

It is more preferable for the relation between $r_1$ and FL to satisfy an expression $0.4 \leq r_1/FL \leq 0.48$.

According to a more preferable embodiment, a condition expressed by a following expression (3) is satisfied:

$$0.85 \leq f_1/FL \leq 1 \quad (3)$$

where, $f_1$ in the expression (3) is focal distance of the first lens 3 (the same applies hereinafter).

Here, when the value of $f_1$/FL is less than the value (0.85) shown in the expression (3), the power of the first lens 3 becomes too large compared to the power of the overall optical system. Therefore, achieving the desired optical performance becomes difficult. On the other hand, when the value of $f_1$/FL is greater than the value (1) shown in the expression (3), the power of the first lens 3 becomes too small compared to the power of the overall optical system. Size and weight reduction of the overall optical system becomes difficult to achieve.

Therefore, by the value of $f_1$/FL being set to satisfy the expression (3), excellent balance can be further achieved between size and weight reduction and improvement in optical performance.

It is more preferable for the relation between $f_1$ and FL to satisfy an expression $0.9 \leq f_1/FL \leq 1$.

According to a more preferable embodiment, a condition expressed by a following expression (4) is satisfied:

$$0.65 \leq d_2/d_1 \leq 1.25 \quad (4)$$

where, $d_1$ in the expression (4) is center thickness of the first lens 3 (the same applies hereinafter). d2 in the expression (4) is distance between the first lens 3 and the second lens 4 on the optical axis 6 (the same applies hereinafter).

Here, when the value of $d_2/d_1$ is less than the value (0.65) shown in the expression (4), the distance between the first lens 3 and the second lens 4 becomes too narrow. Inserting a blocking shield or the like between the first lens 3 and the second lens 4 to effectively block unnecessary light becomes difficult. In addition, edge sections of respective optical surfaces of the first lens 3 and the second lens 4 become too close to each other, thereby increasing generation of unnecessary light. On the other hand, when the value of $d_2/d_1$ is greater than the value (1.25) shown in the expression (4), the center thickness of the first lens 3 becomes too thin. Manufacturing the first lens 3 becomes difficult when the first lens 3 is manufactured by injection molding.

Therefore, by the value of $d_2/d_1$ being set to satisfy the expression (4), a means for effectively blocking unnecessary light can be appropriately employed while maintaining productivity.

It is more preferable for the relation between $d_1$ and $d_2$ to satisfy an expression $0.7 \leq d_2/d_1 \leq 1.2$.

According to a more preferable embodiment, a condition expressed by a following expression (5) is satisfied:

$$0.65 \leq d_2/d_3 \leq 1.1 \quad (5)$$

where, $d_3$ in the expression (5) is center thickness of the second lens 4 (the same applies hereinafter).

Here, when the value of $d_2/d_3$ is less than the value (0.65) shown in the expression (5), the distance between the first lens 3 and the second lens 4 becomes too narrow. Inserting a blocking shield or the like between the first lens 3 and the second lens 4 to effectively block unnecessary light becomes difficult. In addition, the edge sections of respective optical surfaces of the first lens 3 and the second lens 4 become too close to each other, thereby increasing generation of unnecessary light. On the other hand, when the value of $d_2/d_3$ is greater than the value (1.1) shown in the expression (5), the center thickness of the second lens 4 becomes too thin. Manufacturing the second lens 4 becomes difficult when the second lens 4 is manufactured by injection molding.

Therefore, by the value of $d_2/d_3$ being set to satisfy the expression (5), a means for effectively blocking unnecessary light can be appropriately employed while maintaining productivity.

It is more preferable for the relation between $d_2$ and $d_3$ to satisfy an expression $0.65 \leq d_2/d_3 \leq 1$.

According to a more preferable embodiment, a condition expressed by a following expression (6) is satisfied:

$$0.1 \leq d_1/FL \leq 0.3 \quad (6).$$

Here, when the value of $d_1$/FL is less than the value (0.1) shown in the expression (6), the center thickness of the first lens 3 becomes too thin. Manufacturing the first lens 3 becomes difficult when the first lens 3 is manufactured by injection molding. On the other hand, when the value of $d_1$/FL is greater than the value (0.3) shown in the expression (6), the center thickness of the first lens 3 becomes too thick compared to the overall length of the optical system. Size and weight reduction become difficult to achieve.

Therefore, by the value of $d_1$/FL being set to satisfy the expression (6), excellent balance can be further achieved between size and weight reduction and maintenance of productivity.

It is more preferable for the relation between $d_1$ and FL to satisfy an expression $0.15 \leq d_1/FL \leq 0.27$.

According to a more preferable embodiment, a condition expressed by a following expression (7) is satisfied:

$$0.1 \leq d_3/FL \leq 0.3 \quad (7).$$

Here, when the value of $d_3$/FL is less than the value (0.1) shown in the expression (7), the center thickness of the second lens 4 becomes too thin. Manufacturing the second lens 4 becomes difficult when the second lens 4 is manufactured by injection molding. On the other hand, when the value of $d_3$/FL is greater than the value (0.3) shown in the expression (7), the center thickness of the second lens 4 becomes too thick compared to the overall length of the optical system. Size and weight reduction become difficult to achieve.

Therefore, by the value of $d_3$/FL being set to satisfy the expression (7), productivity can be maintained while more effectively reducing size and weight.

It is more preferable for the relation between $d_3$ and FL to satisfy an expression $0.15 \leq d_3/FL \leq 0.27$.

According to a more preferable embodiment, a condition expressed by a following expression (8) is satisfied:

$$0.9 \leq L/FL \leq 1.2 \quad (8)$$

where, L in the expression (8) is entire length of the lens system, in other words, distance from the surface positioned closest to the object side to the image taking surface 5 on the optical axis 6 [air reduced length] (the same applies hereinafter).

Here, when the value of L/FL is less than the value (0.9) shown in the expression (8), the overall length of the optical system becomes too short. Productivity during an assembly process of each of the lenses 3 and 4 deteriorates. On the other hand, when the value of L/FL is greater than the value (1.2) shown in the expression (8), the overall length of the optical system becomes too long. Mounting in a small camera of a mobile phone or the like becomes difficult.

Therefore, by the value of L/FL being set to satisfy the expression (8), balance can be more effectively achieved between size and weight reduction and maintenance of productivity.

It is more preferable for the relation between L and FL to satisfy an expression $0.95 \leq L/FL \leq 1.15$.

Moreover, examples of a resin material used for molding the first lens 3 and the second lens 4 may be materials of various compositions with transparency, such as acrylic resin, polycarbonate resin, amorphous polyolefin resin, etc. However, from the perspective of further improving the manufacturing efficiency and further reducing the manufacturing costs, it is preferable that the resin materials of both lenses 3 and 4 are unified and are the same resin material.

EXAMPLES

Next, EXAMPLES of the present invention will be described by referring to FIG. 2 to FIG. 39.

In the EXAMPLES, Fno denotes F number and r denotes the curvature radius of the optical surface (the center radius curvature in the case of a lens). Further, d denotes a distance to the next optical surface on the optical axis 6, nd denotes the index of refraction when the d line (yellow) is irradiated, and vd denotes the Abbe number of each optical system also when the d line is irradiated.

k, A, B, C, and D denote each coefficient in a following expression (9). Specifically, the shape of the aspherical surface of the lens is expressed by the following expression provided that the direction of the optical axis 6 is taken as the Z axis, the direction orthogonal to the optical axis 6 is taken as the X axis, the traveling direction of light is positive, k is the constant of cone, A, B, C, and D are the aspherical coefficients, and r is the curvature radius.

$$Z(X) = r^{-1} X^2 / [1 + \{1 - (k+1) r^{-2} X^2\}^{1/2}] + AX^4 + BX^6 + CX^8 + DX^{10} \quad (9)$$

In the following EXAMPLES, reference code E used for a numerical value denoting the constant of cone and the aspherical coefficient indicates that the numerical value following E is an exponent having 10 as the base and that the numerical value before E is multiplied by the numerical value denoted by the exponent having 10 as the base. For example, $-2.18E+3$ denotes $-2.18 \times 10^3$.

First Example

FIG. 2 shows a FIRST EXAMPLE of the present invention. The lens 1 in the FIRST EXAMPLE is identical with the lens 1 whose composition is shown in FIG. 1. In the FIRST EXAMPLE, a surface apex (a point intersecting with an optical axis 6) and surrounding area of a first face 3a of the first lens 3 passes through the diaphragm 2 and is positioned closest to the object side.

The imaging lens 1 of the FIRST EXAMPLE was set under the following condition.

Lens Data
L = 1.65 mm, FL = 1.45 mm, $f_1$ = 1.332 mm,
$f_2$ = −9.764 mm, Fno = 2.8

| Face Number | r | d | nd | vd |
|---|---|---|---|---|
| (Object Point) | | | | |
| 1 (Diaphragm) | ∞ | −0.040 | | |
| 2 (First Face of First Lens) | 0.680 | 0.370 | 1.531 | 56.0 |
| 3 (Second Face of First Lens) | 13.000 | 0.265 | | |
| 4 (First Face of Second Lens) | −5.500 | 0.380 | 1.531 | 56.0 |
| 5 (Second Face of Second Lens) | 100.000 | | | |
| (Image Surface) | | | | |

| Face Number | k | A | B | C | D |
|---|---|---|---|---|---|
| 2 | 0 | −2.10 | 7.86E+1 | −2.18E+3 | 2.95E+4 |
| 3 | 0 | −1.31 | −2.46E+1 | 2.98E+1 | 2.31E+3 |
| 4 | 0 | −5.76E−1 | −1.68E+2 | 3.93E+3 | −5.87E+4 |
| 5 | 0 | −7.14E−1 | −3.26 | −1.33E+1 | 2.17E+2 |

Under such conditions, $r_1/r_2 = 0.52$ was achieved, thereby satisfying the expression (1). $r_1/FL = 0.469$ was achieved, thereby satisfying the expression (2). $f_1/FL = 0.919$ was achieved, thereby satisfying the expression (3). $d_2/d_1 = 0.72$ was achieved, thereby satisfying the expression (4). $d_2/d_3 = 0.70$ was achieved, thereby satisfying the expression (5). $d_1/FL = 0.26$ was achieved, thereby satisfying the expression (6). $d_3/FL = 0.26$ was achieved, thereby satisfying the expression (7). $L/FL = 1.138$ was achieved, thereby satisfying the expression (8).

FIG. 3 shows the astigmatism and distortion of the imaging lens 1 of the FIRST EXAMPLE.

According to the result, each of the astigmatism and distortion was almost satisfied. It can be seen from the result that a sufficient optical property can be obtained.

Second Example

FIG. 4 shows a SECOND EXAMPLE of the present invention. In the SECOND EXAMPLE, a surface apex and surrounding area of a first face 3a of the first lens 3 passes through the diaphragm 2 and is positioned closest to the object side.

The imaging lens 1 of the SECOND EXAMPLE was set under the following condition.

Lens Data
L = 1.65 mm, FL = 1.427 mm, $f_1$ = 1.337 mm,
$f_2$ = −14.36 mm, Fno = 2.8

| Face Number | r | d | nd | Nd |
|---|---|---|---|---|
| (Object Point) | | | | |
| 1 (Diaphragm) | ∞ | −0.040 | | |
| 2 (First Face of First Lens) | 0.680 | 0.370 | 1.531 | 56.0 |
| 3 (Second Face of First Lens) | 12.000 | 0.265 | | |
| 4 (First Face of Second Lens) | −5.500 | 0.380 | 1.531 | 56.0 |
| 5 (Second Face of Second Lens) | −20.000 | | | |
| (Image Surface) | | | | |

| Face Number | k | A | B | C | D |
|---|---|---|---|---|---|
| 2 | 0 | −2.10 | 7.90E+1 | −2.18E+3 | 2.95E+4 |
| 3 | 0 | −1.21 | −2.46E+1 | 4.19E+1 | 2.16E+3 |
| 4 | 0 | −3.69E−1 | −1.68E+2 | 3.90E+3 | −5.83E+4 |
| 5 | 0 | −5.95E−1 | −3.88 | −1.09E+1 | 2.13E+2 |

Under such conditions, $r_1/r_2 = 0.057$ was achieved, thereby satisfying the expression (1). $r_1/FL = 0.477$ was achieved, thereby satisfying the expression (2). $f_1/FL = 0.937$ was achieved, thereby satisfying the expression (3). $d_2/d_1 = 0.72$ was achieved, thereby satisfying the expression (4) $d_2/d_3 = 0.70$ was achieved, thereby satisfying the expression (5). $d_1$/FL=0.26 was achieved, thereby satisfying the expression (6). $d_3$/FL=0.27 was achieved, thereby satisfying the expression (7). L/FL=1.156 was achieved, thereby satisfying the expression (8).

FIG. 5 shows the astigmatism and distortion of the imaging lens 1 of the SECOND EXAMPLE.

According to the result, each of the astigmatism and distortion was almost satisfied. It can be seen from the result that a sufficient optical property can be obtained.

Third Example

FIG. 6 shows a THIRD EXAMPLE of the present invention. In the THIRD EXAMPLE, a surface apex and surrounding area of a first face 3a of the first lens 3 passes through the diaphragm 2 and is positioned closest to the object side.

The imaging lens 1 of the THIRD EXAMPLE was set under the following condition.

Lens Data
L = 1.36 mm, FL = 1.2 mm, $f_1$ = 1.1 mm, $f_2$ = −8.067 mm, Fno = 2.8

| Face Number | r | d | nd | vd |
| --- | --- | --- | --- | --- |
| (Object Point) | | | | |
| 1 (Diaphragm) | ∞ | −0.030 | | |
| 2 (First Face of First Lens) | 0.550 | 0.300 | 1.531 | 56.0 |
| 3 (Second Face of First Lens) | 7.100 | 0.210 | | |
| 4 (First Face of Second Lens) | −4.500 | 0.300 | 1.531 | 56.0 |
| 5 (Second Face of Second Lens) (Image Surface) | 100.000 | | | |

| Face Number | k | A | B | C | D |
| --- | --- | --- | --- | --- | --- |
| 2 | 0 | −3.61 | 2.13E+2 | −9.43E+3 | 2.00E+5 |
| 3 | 0 | −2.90 | −4.85E+1 | −4.11E+2 | 2.10E+4 |
| 4 | 0 | −3.69 | −3.41E+2 | 1.40E+4 | −3.71E+5 |
| 5 | 0 | −2.36 | 9.52 | −2.12E+2 | 1.89E+3 |

Under such conditions, $r_1/r_2$=0.077 was achieved, thereby satisfying the expression (1). $r_1$/FL=0.458 was achieved, thereby satisfying the expression (2). $f_1$/FL=0.917 was achieved, thereby satisfying the expression (3). $d_2/d_1$=0.70 was achieved, thereby satisfying the expression (4). $d_2/d_3$=0.70 was achieved, thereby satisfying the expression (5). $d_1$/FL=0.25 was achieved, thereby satisfying the expression (6). $d_3$/FL=0.25 was achieved, thereby satisfying the expression (7). L/FL=1.133 was achieved, thereby satisfying the expression (8).

FIG. 7 shows the astigmatism and distortion of the imaging lens 1 of the THIRD EXAMPLE.

According to the result, each of the astigmatism and distortion was almost satisfied. It can be seen from the result that a sufficient optical property can be obtained.

Fourth Example

FIG. 8 shows a FOURTH EXAMPLE of the present invention. In the FOURTH EXAMPLE, a surface apex and surrounding area of a first face 3a of the first lens 3 passes through the diaphragm 2 and is positioned closest to the object side.

The imaging lens 1 of the FOURTH EXAMPLE was set under the following condition.

Lens Data
L = 1.37 mm, FL = 1.21 mm, $f_1$ = 1.112 mm, $f_2$ = −8.334 mm, Fno = 2.8

| Face Number | r | d | nd | vd |
| --- | --- | --- | --- | --- |
| (Object Point) | | | | |
| 1 (Diaphragm) | ∞ | −0.030 | | |
| 2 (First Face of First Lens) | 0.5556 | 0.300 | 1.531 | 56.0 |
| 3 (Second Face of First Lens) | 7.1429 | 0.215 | | |
| 4 (First Face of Second Lens) | −4.4440 | 0.310 | 1.531 | 56.0 |
| 5 (Second Face of Second Lens) (Image Surface) | 0 | | | |

| Face Number | k | A | B | C | D |
| --- | --- | --- | --- | --- | --- |
| 2 | 0 | −3.61 | 2.13E+2 | −9.43E+3 | 2.00E+5 |
| 3 | 0 | −2.90 | −4.85E+1 | −4.11E+2 | 2.10E+4 |
| 4 | 0 | −3.69 | −3.41E+2 | 1.40E+4 | −3.71E+5 |
| 5 | 0 | −2.36 | 9.52 | −2.12E+2 | 1.89E+3 |

Under such conditions, $r_1/r_2$=0.078 was achieved, thereby satisfying the expression (1). $r_1$/FL=0.459 was achieved, thereby satisfying the expression (2). $f_1$/FL=0.919 was achieved, thereby satisfying the expression (3) $d_2/d_1$=0.72 was achieved, thereby satisfying the expression (4). $d_2/d_3$=0.69 was achieved, thereby satisfying the expression (5). $d_1$/FL=0.25 was achieved, thereby satisfying the expression (6). $d_3$/FL=0.26 was achieved, thereby satisfying the expression (7). L/FL=1.132 was achieved, thereby satisfying the expression (8).

FIG. 9 shows the astigmatism and distortion of the imaging lens of the FOURTH EXAMPLE.

According to the result, each of the astigmatism and distortion was almost satisfied. It can be seen from the result that a sufficient optical property can be obtained.

Fifth Example

FIG. 10 shows a FIFTH EXAMPLE of the present invention. In the SECOND EXAMPLE, a surface apex and surrounding area of a first face 3a of the first lens 3 passes through the diaphragm 2 and is positioned closest to the object side.

The imaging lens 1 of the FIFTH EXAMPLE was set under the following condition.

Lens Data
L = 1.36 mm, FL = 1.19 mm, f1 = 1.102 mm, f2 = −8.846 mm, Fno = 2.8
L = 1.36 mm, FL = 1.19 mm, $f_1$ = 1.102 mm, $f_2$ = −8.846 mm, Fno = 2.8

| Face Number | r | D | nd | vd |
| --- | --- | --- | --- | --- |
| (Object Point) | | | | |
| 1 (Diaphragm) | ∞ | −0.030 | | |
| 2 (First Face of First Lens) | 0.550 | 0.300 | 1.531 | 56.0 |
| 3 (Second Face of First Lens) | 7.000 | 0.215 | | |
| 4 (First Face of Second Lens) | −4.500 | 0.310 | 1.531 | 56.0 |
| 5 (Second Face of Second Lens) (Image Surface) | −100.000 | | | |

| Face Number | k | A | B | C | D |
| --- | --- | --- | --- | --- | --- |
| 2 | 0 | −3.61 | 2.13E+2 | −9.43E+3 | 2.00E+5 |
| 3 | 0 | −2.90 | −4.85E+1 | −4.11E+2 | 2.10E+4 |
| 4 | 0 | −3.69 | −3.41E+2 | 1.40E+4 | −3.71E+5 |
| 5 | 0 | −2.36 | 9.52 | −2.12E+2 | 1.89E+3 |

Under such conditions, $r_1/r_2$=0.079 was achieved, thereby satisfying the expression (1). $r_1$/FL=0.462 was achieved, thereby satisfying the expression (2). $f_1/FL=0.926$ was achieved, thereby satisfying the expression (3). $d_2/d_1=0.72$ was achieved, thereby satisfying the expression (4). $d_2/d_3=0.69$ was achieved, thereby satisfying the expression (5). $d_1/FL=0.25$ was achieved, thereby satisfying the expression (6). $d_3/FL=0.26$ was achieved, thereby satisfying the expression (7). $L/FL=1.143$ was achieved, thereby satisfying the expression (8).

FIG. 11 shows the astigmatism and distortion of the imaging lens 1 of the FIFTH EXAMPLE.

According to the result, each of the astigmatism and distortion was almost satisfied. It can be seen from the result that a sufficient optical property can be obtained.

Sixth Example

FIG. 12 shows a SIXTH EXAMPLE of the present invention. In the SIXTH EXAMPLE, a surface apex and surrounding area of a first face 3a of the first lens 3 passes through the diaphragm 2 and is positioned closest to the object side.

The imaging lens 1 of the SIXTH EXAMPLE was set under the following condition.

Lens Data
L = 1.35 mm, FL = 1.196 mm, $f_1$ = 1.091 mm, $f_2$ = −7.501 mm, Fno = 2.8

| Face Number | r | d | nd | Nd |
|---|---|---|---|---|
| (Object Point) | | | | |
| 1 (Diaphragm) | ∞ | −0.030 | | |
| 2 (First Face of First Lens) | 0.5319 | 0.300 | 1.531 | 56.0 |
| 3 (Second Face of First Lens) | 5.000 | 0.215 | | |
| 4 (First Face of Second Lens) | −4.000 | 0.310 | 1.531 | 56.0 |
| 5 (Second Face of Second Lens) (Image Surface) | 0 | | | |

| Face Number | k | A | B | C | D |
|---|---|---|---|---|---|
| 2 | 0 | −3.69 | 2.18E+2 | −9.45E+3 | 2.00E+5 |
| 3 | 0 | −2.53 | −5.82E+1 | −1.86E+2 | 1.85E+4 |
| 4 | 0 | −2.26 | −4.42E+2 | 1.66E+4 | −3.95E+5 |
| 5 | 0 | −2.07 | −1.71 | −7.57E+1 | 1.18E+3 |

Under such conditions, $r_1/r_2=0.106$ was achieved, thereby satisfying the expression (1). $r_1/FL=0.445$ was achieved, thereby satisfying the expression (2). $f_1/FL=0.912$ was achieved, thereby satisfying the expression (3). $d_2/d_1=0.72$ was achieved, thereby satisfying the expression (4). $d_2/d_3=0.69$ was achieved, thereby satisfying the expression (5). $d_1/FL=0.25$ was achieved, thereby satisfying the expression (6). $d_3/FL=0.26$ was achieved, thereby satisfying the expression (7). $L/FL=1.129$ was achieved, thereby satisfying the expression (8).

FIG. 13 shows the astigmatism and distortion of the imaging lens 1 of the SIXTH EXAMPLE.

According to the result, each of the astigmatism and distortion was almost satisfied. It can be seen from the result that a sufficient optical property can be obtained.

Seventh Example

FIG. 14 shows a SEVENTH EXAMPLE of the present invention. In the SEVENTH EXAMPLE, a surface apex and surrounding area of a first face 3a of the first lens 3 passes through the diaphragm 2 and is positioned closest to the object side.

The imaging lens 1 of the SEVENTH EXAMPLE was set under the following condition.

Lens Data
L = 1.38 mm, FL = 1.215 mm, $f_1$ = 1.132 mm, $f_2$ = −11.05 mm, Fno = 2.8

| Face Number | r | d | nd | vd |
|---|---|---|---|---|
| (Object Point) | | | | |
| 1 (Diaphragm) | ∞ | −0.030 | | |
| 2 (First Face of First Lens) | 0.550 | 0.300 | 1.531 | 56.0 |
| 3 (Second Face of First Lens) | 5.000 | 0.210 | | |
| 4 (First Face of Second Lens) | −4.750 | 0.300 | 1.531 | 56.0 |
| 5 (Second Face of Second Lens) (Image Surface) | −25.000 | | | |

| Face Number | k | A | B | C | D |
|---|---|---|---|---|---|
| 2 | 0 | −3.69 | 2.18E+2 | −9.45E+3 | 2.00E+5 |
| 3 | 0 | −2.53 | −5.82E+1 | −1.86E+2 | 1.85E+4 |
| 4 | 0 | −2.26 | −4.42E+2 | 1.66E+4 | −3.95E+5 |
| 5 | 0 | −2.07 | −1.71 | −7.57E+1 | 1.18E+3 |

Under such conditions, $r_1/r_2=0.110$ was achieved, thereby satisfying the expression (1). $r_1/FL=0.453$ was achieved, thereby satisfying the expression (2). $f_1/FL=0.932$ was achieved, thereby satisfying the expression (3). $d_2/d_1=0.70$ was achieved, thereby satisfying the expression (4). $d_2/d_3=0.70$ was achieved, thereby satisfying the expression (5). $d_1/FL=0.25$ was achieved, thereby satisfying the expression (6). $d_3/FL=0.25$ was achieved, thereby satisfying the expression (7). $L/FL=1.136$ was achieved, thereby satisfying the expression (8).

FIG. 15 shows the astigmatism and distortion of the imaging lens 1 of the SEVENTH EXAMPLE.

According to the result, each of the astigmatism and distortion was almost satisfied. It can be seen from the result that a sufficient optical property can be obtained.

Eighth Example

FIG. 16 shows a EIGHTH EXAMPLE of the present invention. In the EIGHTH EXAMPLE, a surface apex and surrounding area of a first face 3a of the first lens 3 passes through the diaphragm 2 and is positioned closest to the object side.

The imaging lens 1 of the EIGHTH EXAMPLE was set under the following condition.

Lens Data
L = 1.32 mm, FL = 1.19 mm, $f_1$ = 1.065 mm, $f_2$ = −5.09 mm, Fno = 2.8

| Face Number | r | d | nd | Nd |
|---|---|---|---|---|
| (Object Point) | | | | |
| 1 (Diaphragm) | ∞ | −0.030 | | |
| 2 (First Face of First Lens) | 0.5155 | 0.300 | 1.531 | 56.0 |
| 3 (Second Face of First Lens) | 4.4440 | 0.240 | | |
| 4 (First Face of Second Lens) | −4.4440 | 0.310 | 1.531 | 56.0 |
| 5 (Second Face of Second Lens) (Image Surface) | 7.1430 | | | |

| Face Number | k | A | B | C | D |
|---|---|---|---|---|---|
| 2 | 0 | −3.47 | 2.16E+2 | −9.46E+3 | 2.01E+5 |
| 3 | 0 | −2.38 | −2.79E+1 | −6.81E+2 | 2.26E+4 |
| 4 | 0 | −2.87 | −4.04E+2 | 1.57E+4 | −3.82E+5 |
| 5 | 0 | −2.63 | −6.46 | −1.51E+2 | 1.52E+3 |

Under such conditions, $r_1/r_2=0.116$ was achieved, thereby satisfying the expression (1). $r_1/FL=0.433$ was achieved, thereby satisfying the expression (2). $f_1/FL=0.895$ was achieved, thereby satisfying the expression (3). $d_2/d_1=0.80$ was achieved, thereby satisfying the expression (4). $d_2/d_3=0.77$ was achieved, thereby satisfying the expression (5). $d_1/FL=0.25$ was achieved, thereby satisfying the expression (6). $d_3/FL=0.26$ was achieved, thereby satisfying the expression (7). $L/FL=1.109$ was achieved, thereby satisfying the expression (8).

FIG. 17 shows the astigmatism and distortion of the imaging lens 1 of the EIGHTH EXAMPLE.

According to the result, each of the astigmatism and distortion was almost satisfied. It can be seen from the result that a sufficient optical property can be obtained.

Ninth Example

FIG. 18 shows a NINTH EXAMPLE of the present invention. In the NINTH EXAMPLE, a surface apex and surrounding area of a first face 3a of the first lens 3 passes through the diaphragm 2 and is positioned closest to the object side.

The imaging lens 1 of the NINTH EXAMPLE was set under the following condition.

| Lens Data L = 1.3 mm, FL = 1.174 mm, $f_1$ = 1.07 mm, $f_2$ = −7.938 mm, Fno = 2.8 | | | | |
|---|---|---|---|---|
| Face Number | r | d | nd | vd |
| (Object Point) | | | | |
| 1 (Diaphragm) | ∞ | −0.030 | | |
| 2 (First Face of First Lens) | 0.500 | 0.250 | 1.531 | 56.0 |
| 3 (Second Face of First Lens) | 3.333 | 0.265 | | |
| 4 (First Face of Second Lens) | −2.857 | 0.280 | 1.531 | 56.0 |
| 5 (Second Face of Second Lens) (Image Surface) | −9.091 | | | |
| Face Number | k | A | B | C | D |
| 2 | 0 | −3.40 | 1.81E+2 | −7.58E+3 | 1.455E+5 |
| 3 | 0 | −1.84 | −7.81E+1 | 1.59E+3 | −3.02E+4 |
| 4 | 0 | −4.29 | −1.33E+2 | −1.23E+3 | 8.76E+4 |
| 5 | 0 | −1.86 | −9.39 | −1.35E+2 | 2.92E+3 |

Under such conditions, $r_1/r_2=0.150$ was achieved, thereby satisfying the expression (1). $r_1/FL=0.426$ was achieved, thereby satisfying the expression (2). $f_1/FL=0.911$ was achieved, thereby satisfying the expression (3). $d_2/d=1.06$ was achieved, thereby satisfying the expression (4). $d_2/d_3=0.95$ was achieved, thereby satisfying the expression (5). $d_1/FL=0.21$ was achieved, thereby satisfying the expression (6). $d_3/FL=0.24$ was achieved, thereby satisfying the expression (7). $L/FL=1.107$ was achieved, thereby satisfying the expression (8).

FIG. 19 shows the astigmatism and distortion of the imaging lens 1 of the NINTH EXAMPLE.

According to the result, each of the astigmatism and distortion was almost satisfied. It can be seen from the result that a sufficient optical property can be obtained.

Tenth Example

FIG. 20 shows a TENTH EXAMPLE of the present invention. In the TENTH EXAMPLE, a surface apex and surrounding area of a first face 3a of the first lens 3 passes through the diaphragm 2 and is positioned closest to the object side.

The imaging lens 1 of the TENTH EXAMPLE was set under the following condition.

| Lens Data L = 1.33 mm, FL = 1.232 mm, $f_1$ = 1.077 mm, $f_2$ = −4.892 mm, Fno = 2.8 | | | | |
|---|---|---|---|---|
| Face Number | r | d | nd | Nd |
| (Object Point) | | | | |
| 1 (Diaphragm) | ∞ | −0.030 | | |
| 2 (First Face of First Lens) | 0.500 | 0.250 | 1.531 | 56.0 |
| 3 (Second Face of First Lens) | 3.200 | 0.265 | | |
| 4 (First Face of Second Lens) | −2.700 | 0.280 | 1.531 | 56.0 |
| 5 (Second Face of Second Lens) (Image Surface) | 80.000 | | | |
| Face Number | k | A | B | C | D |
| 2 | 0 | −3.58 | 1.99E+2 | −8.35E+3 | 1.54E+5 |
| 3 | 0 | −2.17 | −8.43E+1 | 1.72E+3 | −3.11E+4 |
| 4 | 0 | −5.42 | −1.05E+2 | −1.64E+3 | 8.57E+4 |
| 5 | 0 | −2.59 | 4.59 | −2.78E+2 | 3.62E+3 |

Under such conditions, $r_1/r_2=0.156$ was achieved, thereby satisfying the expression (1). $r_1/FL=0.406$ was achieved, thereby satisfying the expression (2). $f_1/FL=0.874$ was achieved, thereby satisfying the expression (3). $d_2/d_1=1.06$ was achieved, thereby satisfying the expression (4). $d_2/d_3=0.95$ was achieved, thereby satisfying the expression (5) $d_1/FL=0.20$ was achieved, thereby satisfying the expression (6). $d_3/FL=0.23$ was achieved, thereby satisfying the expression (7). $L/FL=1.080$ was achieved, thereby satisfying the expression (8).

FIG. 21 shows the astigmatism and distortion of the imaging lens 1 of the TENTH EXAMPLE.

According to the result, each of the astigmatism and distortion was almost satisfied. It can be seen from the result that a sufficient optical property can be obtained.

Eleventh Example

FIG. 22 shows a ELEVENTH EXAMPLE of the present invention. In the ELEVENTH EXAMPLE, a surface apex and surrounding area of a first face 3a of the first lens 3 passes through the diaphragm 2 and is positioned closest to the object side.

The imaging lens 1 of the ELEVENTH EXAMPLE was set under the following condition.

| Lens Data L = 1.38 mm, FL = 1.216 mm, $f_1$ = 1.205 mm, $f_2$ = −93.76 mm, Fno = 2.8 | | | | |
|---|---|---|---|---|
| Face Number | R | d | nd | Nd |
| (Object Point) | | | | |
| 1 (Diaphragm) | ∞ | −0.030 | | |
| 2 (First Face of First Lens) | 0.550 | 0.250 | 1.531 | 56.0 |
| 3 (Second Face of First Lens) | 3.200 | 0.275 | | |
| 4 (First Face of Second Lens) | −50.000 | 0.310 | 1.531 | 56.0 |
| 5 (Second Face of Second Lens) (Image Surface) | 0.000 | | | |
| Face Number | k | A | B | C | D |
| 2 | 0 | −2.51 | 8.07E+1 | −1.69E+3 | −1.74E+4 |
| 3 | 0 | −1.35 | −6.82E+1 | 9.59E+2 | −1.00E+4 |
| 4 | 0 | −2.84 | −1.31E+2 | 1.77E+3 | −7.03E+3 |
| 5 | 0 | −1.26 | −5.85 | −3.51E+1 | 4.59E+2 |

Under such conditions, $r_1/r_2=0.172$ was achieved, thereby satisfying the expression (1). $r_1/FL=0.452$ was achieved, thereby satisfying the expression (2). $f_1$/FL=0.991 was achieved, thereby satisfying the expression (3). $d_2$/$d_1$=1.08 was achieved, thereby satisfying the expression (4). $d_2$/$d_3$=0.87 was achieved, thereby satisfying the expression (5). $d_1$/FL=0.21 was achieved, thereby satisfying the expression (6). $d_3$/FL=0.25 was achieved, thereby satisfying the expression (7). L/FL=1.135 was achieved, thereby satisfying the expression (8).

FIG. 23 shows the astigmatism and distortion of the imaging lens 1 of the ELEVENTH EXAMPLE.

According to the result, each of the astigmatism and distortion was almost satisfied. It can be seen from the result that a sufficient optical property can be obtained.

Twelfth Example

FIG. 24 shows a TWELFTH EXAMPLE of the present invention. In the TWELFTH EXAMPLE, a surface apex and surrounding area of a first face 3a of the first lens 3 passes through the diaphragm 2 and is positioned closest to the object side.

The imaging lens 1 of the TWELFTH EXAMPLE was set under the following condition.

| Lens Data L = 1.69 mm, FL = 1.549 mm, $f_1$ = 1.504 mm, $f_2$ = −33.07 mm, Fno = 2.8 | | | | |
|---|---|---|---|---|
| Face Number | r | D | nd | Nd |
| (Object Point) | | | | |
| 1 (Diaphragm) | ∞ | −0.040 | | |
| 2 (First Face of First Lens) | 0.650 | 0.260 | 1.531 | 56.0 |
| 3 (Second Face of First Lens) | 2.950 | 0.320 | | |
| 4 (First Face of Second Lens) | −20.000 | 0.300 | 1.531 | 56.0 |
| 5 (Second Face of Second Lens) | 150.000 | | | |
| (Image Surface) | | | | |

| Face Number | k | A | B | C | D |
|---|---|---|---|---|---|
| 2 | 0 | −2.55 | 1.17E+2 | −4.23E+3 | 7.38E+4 |
| 3 | 0 | −1.44 | −3.28E+1 | 3.04E+2 | −2.20E+3 |
| 4 | 0 | −2.02 | −5.56E+1 | 4.01E+2 | 9.36E+1 |
| 5 | 0 | −1.16 | 8.35 | −2.67E+2 | 2.78E+3 |

Under such conditions, $r_1$/$r_2$=0.220 was achieved, thereby satisfying the expression (1). $r_1$/FL=0.420 was achieved, thereby satisfying the expression (2). $f_1$/FL=0.971 was achieved, thereby satisfying the expression (3) $d_2$/$d_1$=1.23 was achieved, thereby satisfying the expression (4). $d_2$/$d_3$=1.07 was achieved, thereby satisfying the expression (5). $d_1$/FL=0.17 was achieved, thereby satisfying the expression (6). $d_3$/FL=0.19 was achieved, thereby satisfying the expression (7). L/FL=1.091 was achieved, thereby satisfying the expression (8).

FIG. 25 shows the astigmatism and distortion of the imaging lens 1 of the TWELFTH EXAMPLE.

According to the result, each of the astigmatism and distortion was almost satisfied. It can be seen from the result that a sufficient optical property can be obtained.

Thirteenth Example

FIG. 26 shows a THIRTEENTH EXAMPLE of the present invention. In the THIRTEENTH EXAMPLE, a surface apex and surrounding area of a first face 3a of the first lens 3 passes through the diaphragm 2 and is positioned closest to the object side.

The imaging lens 1 of the THIRTEENTH EXAMPLE was set under the following condition.

| Lens Data L = 1.63 mm, FL = 1.4749 mm, $f_1$ = 1.451 mm, $f_2$ = −62.6 mm, Fno = 2.8 | | | | |
|---|---|---|---|---|
| Face Number | r | d | Nd | vd |
| (Object Point) | | | | |
| 1 (Diaphragm) | ∞ | −0.040 | | |
| 2 (First Face of First Lens) | 0.630 | 0.260 | 1.531 | 56.0 |
| 3 (Second Face of First Lens) | 2.900 | 0.320 | | |
| 4 (First Face of Second Lens) | −25.000 | 0.330 | 1.531 | 56.0 |
| 5 (Second Face of Second Lens) | −100.000 | | | |
| (Image Surface) | | | | |

| Face Number | k | A | B | C | D |
|---|---|---|---|---|---|
| 2 | 0 | −3.24 | 1.45E+2 | −4.71E+3 | 7.80E+4 |
| 3 | 0 | −1.74 | −1.45E+1 | 9.19E+1 | −1.29E+3 |
| 4 | 0 | −2.04 | −4.85E+1 | 4.24E+2 | 1.33E+1 |
| 5 | 0 | −1.69 | 2.26E+1 | −3.72E+2 | 3.02E+3 |

Under such conditions, $r_1$/$r_2$=0.217 was achieved, thereby satisfying the expression (1). $r_1$/FL=0.427 was achieved, thereby satisfying the expression (2). $f_1$/FL=0.984 was achieved, thereby satisfying the expression (3). $d_2$/$d_1$=1.23 was achieved, thereby satisfying the expression (4). $d_2$/$d_3$=0.97 was achieved, thereby satisfying the expression (5). $d_1$/FL=0.18 was achieved, thereby satisfying the expression (6). $d_3$/FL=0.22 was achieved, thereby satisfying the expression (7). L/FL=1.105 was achieved, thereby satisfying the expression (8).

FIG. 27 shows the astigmatism and distortion of the imaging lens 1 of the THIRTEENTH EXAMPLE.

According to the result, each of the astigmatism and distortion was almost satisfied. It can be seen from the result that a sufficient optical property can be obtained.

Fourteenth Example

FIG. 28 shows a FOURTEENTH EXAMPLE of the present invention. In the FOURTEENTH EXAMPLE, a surface apex and surrounding area of a first face 3a of the first lens 3 passes through the diaphragm 2 and is positioned closest to the object side.

The imaging lens 1 of the FOURTEENTH EXAMPLE was set under the following condition.

| Lens Data L = 1.67 mm, FL = 1.477 mm, $f_1$ = 1.444 mm, $f_2$ = −36.26 mm, Fno = 2.8 | | | | |
|---|---|---|---|---|
| Face Number | r | d | nd | vd |
| (Object Point) | | | | |
| 1 (Diaphragm) | ∞ | −0.040 | | |
| 2 (First Face of First Lens) | 0.615 | 0.380 | 1.531 | 56.0 |
| 3 (Second Face of First Lens) | 2.400 | 0.260 | | |
| 4 (First Face of Second Lens) | −24.000 | 0.390 | 1.531 | 56.0 |
| 5 (Second Face of Second Lens) | 100.000 | | | |
| (Image Surface) | | | | |

| Face Number | k | A | B | C | D |
|---|---|---|---|---|---|
| 2 | 0 | −1.88 | 7.93E+1 | −2.22E+3 | 3.07E+4 |
| 3 | 0 | −1.00 | −1.17E+1 | −1.90E+2 | 4.46E+3 |
| 4 | 0 | −7.55E−2 | −1.63E+2 | 3.84E+3 | −5.85E+4 |
| 5 | 0 | −6.61E−1 | −2.62 | −1.72E+1 | 2.00E+2 |

Under such conditions, $r_1/r_2=0.256$ was achieved, thereby satisfying the expression (1). $r_1/FL=0.416$ was achieved, thereby satisfying the expression (2). $f_1/FL=0.978$ was achieved, thereby satisfying the expression (3). $d_2/d_1=0.68$ was achieved, thereby satisfying the expression (4). $d_2/d_3=0.67$ was achieved, thereby satisfying the expression (5). $d_1/FL=0.26$ was achieved, thereby satisfying the expression (6). $d_3/FL=0.26$ was achieved, thereby satisfying the expression (7). $L/FL=1.131$ was achieved, thereby satisfying the expression (8).

FIG. 29 shows the astigmatism and distortion of the imaging lens 1 of the FOURTEENTH EXAMPLE.

According to the result, each of the astigmatism and distortion was almost satisfied. It can be seen from the result that a sufficient optical property can be obtained.

Fifteenth Example

FIG. 30 shows a FIFTEENTH EXAMPLE of the present invention. In the FIFTEENTH EXAMPLE, a surface apex and surrounding area of a first face 3a of the first lens 3 passes through the diaphragm 2 and is positioned closest to the object side.

The imaging lens 1 of the FIFTEENTH EXAMPLE was set under the following condition.

| Lens Data $L = 1.69$ mm, $FL = 1.496$ mm, $f_1 = 1.467$ mm, $f_2 = -46.88$ mm, $Fno = 2.8$ | | | | |
|---|---|---|---|---|
| Face Number | r | d | nd | vd |
| (Object Point) | | | | |
| 1 (Diaphragm) | ∞ | −0.040 | | |
| 2 (First Face of First Lens) | 0.620 | 0.380 | 1.531 | 56.0 |
| 3 (Second Face of First Lens) | 2.350 | 0.260 | | |
| 4 (First Face of Second Lens) | −25.000 | 0.390 | 1.531 | 56.0 |
| 5 (Second Face of Second Lens) (Image Surface) | 0.000 | | | |

| Face Number | k | A | B | C | D |
|---|---|---|---|---|---|
| 2 | 0 | −1.87 | 7.96E+1 | −2.24E+3 | 3.09E+4 |
| 3 | 0 | −1.08 | −1.06E+1 | −2.17E+2 | 4.66E+3 |
| 4 | 0 | −9.78E−2 | −1.60E+2 | 3.79E+3 | −5.83E+4 |
| 5 | 0 | −5.79E−1 | −3.44 | −1.29E+1 | 1.86E+2 |

Under such conditions, $r_1/r_2=0.264$ was achieved, thereby satisfying the expression (1). $r_1/FL=0.414$ was achieved, thereby satisfying the expression (2). $f_1/FL=0.981$ was achieved, thereby satisfying the expression (3). $d_2/d_1=0.68$ was achieved, thereby satisfying the expression (4). $d_2/d_3=0.67$ was achieved, thereby satisfying the expression (5). $d_1/FL=0.25$ was achieved, thereby satisfying the expression (6). $d_3/FL=0.26$ was achieved, thereby satisfying the expression (7). $L/FL=1.130$ was achieved, thereby satisfying the expression (8).

FIG. 31 shows the astigmatism and distortion of the imaging lens 1 of the FIFTEENTH EXAMPLE.

According to the result, each of the astigmatism and distortion was almost satisfied. It can be seen from the result that a sufficient optical property can be obtained.

Sixteenth Example

FIG. 32 shows a SIXTEENTH EXAMPLE of the present invention. In the SIXTEENTH EXAMPLE, a surface apex and surrounding area of a first face 3a of the first lens 3 passes through the diaphragm 2 and is positioned closest to the object side.

The imaging lens 1 of the SIXTEENTH EXAMPLE was set under the following condition.

| Lens Data $L = 1.68$ mm, $FL = 1.49$ mm, $f_1 = 1.466$ mm, $f_2 = -59.42$ mm, $Fno = 2.8$ | | | | |
|---|---|---|---|---|
| Face Number | r | d | Nd | vd |
| (Object Point) | | | | |
| 1 (Diaphragm) | ∞ | −0.040 | | |
| 2 (First Face of First Lens) | 0.6195 | 0.380 | 1.531 | 56.0 |
| 3 (Second Face of First Lens) | 2.3467 | 0.260 | | |
| 4 (First Face of Second Lens) | −25.8700 | 0.390 | 1.531 | 56.0 |
| 5 (Second Face of Second Lens) (Image Surface) | −141.6000 | | | |

| Face Number | k | A | B | C | D |
|---|---|---|---|---|---|
| 2 | 0 | −1.81 | 7.89E+1 | −2.23E+3 | 3.09E+4 |
| 3 | 0 | −1.27 | −1.69 | −3.40E+2 | 5.29E+3 |
| 4 | 0 | −8.35E−1 | −1.37E+2 | 3.49E+3 | −5.66E+4 |
| 5 | 0 | −8.29E−1 | −9.67E−1 | −1.86E+1 | 1.55E+2 |

Under such conditions, $r_1/r_2=0.264$ was achieved, thereby satisfying the expression (1). $r_1/FL=0.416$ was achieved, thereby satisfying the expression (2). $f_1/FL=0.984$ was achieved, thereby satisfying the expression (3). $d_2/d_1=0.68$ was achieved, thereby satisfying the expression (4). $d_2/d_3=0.67$ was achieved, thereby satisfying the expression (5). $d_1/FL=0.26$ was achieved, thereby satisfying the expression (6). $d_3/FL=0.26$ was achieved, thereby satisfying the expression (7). $L/FL=1.128$ was achieved, thereby satisfying the expression (8).

FIG. 33 shows the astigmatism and distortion of the imaging lens 1 of the SIXTEENTH EXAMPLE.

According to the result, each of the astigmatism and distortion was almost satisfied. It can be seen from the result that a sufficient optical property can be obtained.

Seventeenth Example

FIG. 34 shows a SEVENTEENTH EXAMPLE of the present invention. In the SEVENTEENTH EXAMPLE, a surface apex and surrounding area of a first face 3a of the first lens 3 passes through the diaphragm 2 and is positioned closest to the object side.

The imaging lens 1 of the SEVENTEENTH EXAMPLE was set under the following condition.

| Lens Data $L = 1.74$ mm, $FL = 1.561$ mm, $f_1 = 1.52$ mm, $f_2 = -34.41$ mm, $Fno = 2.8$ | | | | |
|---|---|---|---|---|
| Face Number | r | d | nd | vd |
| (Object Point) | | | | |
| 1 (Diaphragm) | ∞ | −0.040 | | |
| 2 (First Face of First Lens) | 0.630 | 0.370 | 1.531 | 56.0 |
| 3 (Second Face of First Lens) | 2.250 | 0.260 | | |
| 4 (First Face of Second Lens) | −22.500 | 0.380 | 1.531 | 56.0 |
| 5 (Second Face of Second Lens) (Image Surface) | 100.000 | | | |

| Face Number | k | A | B | C | D |
|---|---|---|---|---|---|
| 2 | 0 | −1.85 | 7.74E+1 | −2.20E+3 | 2.98E+4 |
| 3 | 0 | −1.48 | −7.51 | −2.93E+2 | 5.17E+3 |

-continued

Lens Data
L = 1.74 mm, FL = 1.561 mm, $f_1$ = 1.52 mm, $f_2$ = −34.41 mm, Fno = 2.8

| | | | | | |
|---|---|---|---|---|---|
| 4 | 0 | −6.43E−1 | −1.52E+2 | 3.70E+3 | −5.84E+4 |
| 5 | 0 | −6.02E−1 | −4.34 | −8.84 | 1.89E+2 |

Under such conditions, $r_1/r_2$=0.280 was achieved, thereby satisfying the expression (1). $r_1/FL$=0.404 was achieved, thereby satisfying the expression (2). $f_1/FL$=0.974 was achieved, thereby satisfying the expression (3). $d_2/d_1$=0.70 was achieved, thereby satisfying the expression (4). $d_2/d_3$=0.68 was achieved, thereby satisfying the expression (5). $d_1/FL$=0.24 was achieved, thereby satisfying the expression (6) $d_3/FL$=0.24 was achieved, thereby satisfying the expression (7). $L/FL$=1.115 was achieved, thereby satisfying the expression (8).

FIG. 35 shows the astigmatism and distortion of the imaging lens 1 of the SEVENTEENTH EXAMPLE.

According to the result, each of the astigmatism and distortion was almost satisfied. It can be seen from the result that a sufficient optical property can be obtained.

Eighteenth Example

FIG. 36 shows a EIGHTEENTH EXAMPLE of the present invention. In the EIGHTEENTH EXAMPLE, a surface apex and surrounding area of a first face 3a of the first lens 3 passes through the diaphragm 2 and is positioned closest to the object side.

The imaging lens 1 of the EIGHTEENTH EXAMPLE was set under the following condition.

Lens Data
L = 1.72 mm, FL = 1.542 mm, $f_1$ = 1.51 mm, $f_2$ = −46.88 mm, Fno = 2.8

| Face Number | r | D | nd | vd |
|---|---|---|---|---|
| (Object Point) | | | | |
| 1 (Diaphragm) | ∞ | −0.040 | | |
| 2 (First Face of First Lens) | 0.625 | 0.380 | 1.531 | 56.0 |
| 3 (Second Face of First Lens) | 2.200 | 0.240 | | |
| 4 (First Face of Second Lens) | −25.000 | 0.370 | 1.531 | 56.0 |
| 5 (Second Face of Second Lens) (Image Surface) | 0.000 | | | |

| Face Number | k | A | B | C | D |
|---|---|---|---|---|---|
| 2 | 0 | −1.91 | 7.92E+1 | −2.24E+3 | 3.06E+4 |
| 3 | 0 | −1.54 | −1.07E+1 | −2.74E+2 | 5.03E+3 |
| 4 | 0 | −5.41E−1 | −1.69E+2 | 4.03E+3 | −6.11E+4 |
| 5 | 0 | −6.29E−1 | −5.21 | −2.94E−1 | 1.67E+2 |

Under such conditions, $r_1/r_2$=0.284 was achieved, thereby satisfying the expression (1) $r_1/FL$=0.405 was achieved, thereby satisfying the expression (2). $f_1/FL$=0.979 was achieved, thereby satisfying the expression (3). $d_2/d_1$=0.63 was achieved, thereby satisfying the expression (4). $d_2/d_3$=0.65 was achieved, thereby satisfying the expression (5). $d_1/FL$=0.25 was achieved, thereby satisfying the expression (6). $d_3/FL$=0.24 was achieved, thereby satisfying the expression (7). $L/FL$=1.115 was achieved, thereby satisfying the expression (8).

FIG. 37 shows the astigmatism and distortion of the imaging lens 1 of the EIGHTEENTH EXAMPLE.

According to the result, each of the astigmatism and distortion was almost satisfied. It can be seen from the result that a sufficient optical property can be obtained.

Nineteenth Example

FIG. 38 shows a NINETEENTH EXAMPLE of the present invention. In the NINETEENTH EXAMPLE, a surface apex and surrounding area of a first face 3a of the first lens 3 passes through the diaphragm 2 and is positioned closest to the object side.

The imaging lens 1 of the NINETEENTH EXAMPLE was set under the following condition.

Lens Data
L = 1.73 mm, FL = 1.541 mm, $f_1$ = 1.515 mm, $f_2$ = −62.62 mm, Fno = 2.8

| Face Number | r | d | nd | vd |
|---|---|---|---|---|
| (Object Point) | | | | |
| 1 (Diaphragm) | ∞ | −0.040 | | |
| 2 (First Face of First Lens) | 0.625 | 0.380 | 1.531 | 56.0 |
| 3 (Second Face of First Lens) | 2.175 | 0.260 | | |
| 4 (First Face of Second Lens) | −25.000 | 0.390 | 1.531 | 56.0 |
| 5 (Second Face of Second Lens) (Image Surface) | −100.000 | | | |

| Face Number | k | A | B | C | D |
|---|---|---|---|---|---|
| 2 | 0 | −1.82 | 7.83E+1 | −2.21E+3 | 3.00E+4 |
| 3 | 0 | −1.25 | −7.28 | −2.75E+2 | 5.02E+3 |
| 4 | 0 | −4.85E−1 | −1.46E+2 | 3.58E+3 | −5.73E+4 |
| 5 | 0 | −6.14E−1 | −2.56 | −2.13E+1 | 2.22E+2 |

Under such conditions, $r_1/r_2$=0.287 was achieved, thereby satisfying the expression (1). $r_1/FL$=0.406 was achieved, thereby satisfying the expression (2). $f_1/FL$=0.983 was achieved, thereby satisfying the expression (3) $d_2/d_1$=0.68 was achieved, thereby satisfying the expression (4). $d_2/d_3$=0.67 was achieved, thereby satisfying the expression (5). $d_1/FL$=0.25 was achieved, thereby satisfying the expression (6). $d_3/FL$=0.25 was achieved, thereby satisfying the expression (7). $L/FL$=1.123 was achieved, thereby satisfying the expression (8).

FIG. 39 shows the astigmatism and distortion of the imaging lens 1 of the NINETEENTH EXAMPLE.

According to the result, each of the astigmatism and distortion was almost satisfied. It can be seen from the result that a sufficient optical property can be obtained.

The present invention is not limited to the above-described embodiments and EXAMPLES, and various modifications are possible as required.

What is claimed is:

1. An imaging lens used for forming an image of an object on an image-taking surface of a solid image pickup element, consisting of:
   in order from an object side to an image surface side, a diaphragm, a first lens that is a meniscus lens having a positive power whose convex surface faces the object side, and a second lens that is a lens having a negative power whose concave surface faces the object side, wherein a condition expressed by the following expression (1) is to be satisfied:

$$0.05 \leq r_1/r_2 \leq 0.29 \tag{1}$$

where,
$r_1$: center radius curvature of the object side face of the first lens and
$r_2$: center radius curvature of the image surface side face of the first lens; and wherein, further, a condition expressed by a following expression (2) is to be satisfied:

$$0.4 \leq r_1/FL \leq 0.5 \quad (2)$$

where,

FL: focal distance of the entire lens system.

2. The imaging lens according to claim 1, wherein, further, a condition expressed by a following expression (3) is to be satisfied:

$$0.85 \leq f_1/FL \leq 1 \quad (3)$$

where, $f_1$: focal distance of the first lens, and

FL: focal distance of the entire lens system.

3. The imaging lens according to claim 1, wherein, further, a condition expressed by a following expression (4) is to be satisfied:

$$0.65 \leq d_2/d_1 \leq 1.25 \quad (4)$$

where, $d_1$: center thickness of the first lens, and $d_2$: distance between the first lens and the second lens on the optical axis.

4. The imaging lens according to claim 1, wherein, further, a condition expressed by a following expression (5) is to be satisfied:

$$0.65 \leq d_2/d_3 \leq 1.1 \quad (5)$$

where, $d_2$: distance between the first lens and the second lens on the optical axis, and $d_3$: center thickness of the second lens.

5. The imaging lens according to claim 1, a condition expressed by a following expression (6) is further satisfied:

$$0.1 \leq d_1/FL \leq 0.3 \quad (6)$$

where, $d_1$: center thickness of the first lens.

6. The imaging lens according to claim 1, wherein, further, a condition expressed by a following expression (7) is further satisfied:

$$0.1 \leq d_3/FL \leq 0.3 \quad (7)$$

where, $d_3$: center thickness of the second lens.

7. The imaging lens according to claim 1, wherein, further, a condition expressed by a following expression (8) is further satisfied:

$$0.9 \leq L/FL \leq 1.2 \quad (8)$$

where,

L: entire length of the lens system (distance from the surface positioned closest to the object side to the image taking surface on the optical axis [air reduced length]).

* * * * *